(12) United States Patent
Park et al.

(10) Patent No.: US 10,244,384 B2
(45) Date of Patent: Mar. 26, 2019

(54) APPARATUS AND METHOD FOR PROFILE INSTALLATION IN COMMUNICATION SYSTEM

(71) Applicant: Samsung Electronics Co., Ltd., Suwon-si, Gyeonggi-do (KR)

(72) Inventors: Jonghan Park, Bucheon-si (KR); Duckey Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/936,236

(22) Filed: Mar. 26, 2018

(65) Prior Publication Data

US 2018/0213393 A1 Jul. 26, 2018

Related U.S. Application Data

(63) Continuation of application No. 14/943,983, filed on Nov. 17, 2015, now Pat. No. 9,930,520.

(Continued)

(51) Int. Cl.
*H04M 3/00* (2006.01)
*H04W 8/20* (2009.01)
(Continued)

(52) U.S. Cl.
CPC .............. *H04W 8/205* (2013.01); *H04L 67/30* (2013.01); *H04L 67/42* (2013.01); *H04W 4/50* (2018.02);
(Continued)

(58) Field of Classification Search
CPC ..... H04L 67/34; H04L 63/0428; H04L 67/42; H04L 67/30; H04L 29/06; H04L 29/08;
(Continued)

(56) References Cited

U.S. PATENT DOCUMENTS 9,930,520 B2 *  3/2018  Park ...................... H04W 8/205
9,998,925 B2 *  6/2018  Yang ..................... H04W 12/06
(Continued)

FOREIGN PATENT DOCUMENTS

KR      20130026352 A  *  3/2013  ............ H04W 12/04
WO      WO-03036907 A1 *  5/2003  ......... H04L 12/1859
(Continued)

*Primary Examiner* — Mahendra Patel

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technologies, such as smart home, smart building, smart city, smart car, connected car, health care, digital education, smart retail, security and safety services. A method of providing a profile package by a profile server and the profile server includes generating a profile package, dividing the profile package in a unit installable in a UICC of an electronic device, reconfiguring the divided profile information in an encryptable unit, and transmitting the reconfigured profile information to the electronic device. Further, provided is an operating method and apparatus of an electronic device communicating with the profile server.

14 Claims, 19 Drawing Sheets

Related U.S. Application Data

(60) Provisional application No. 62/080,910, filed on Nov. 17, 2014.

(51) Int. Cl.
*H04L 29/06* (2006.01)
*H04W 12/04* (2009.01)
*H04L 29/08* (2006.01)
*H04W 12/02* (2009.01)
*H04W 4/50* (2018.01)
*H04W 4/60* (2018.01)

(52) U.S. Cl.
CPC ........... *H04W 12/02* (2013.01); *H04W 12/04* (2013.01); *H04L 63/0428* (2013.01); *H04L 67/34* (2013.01); *H04W 4/60* (2018.02)

(58) Field of Classification Search
CPC ......... H04W 4/60; H04W 8/20; H04W 8/205; H04W 12/04; H04W 12/02; H04W 4/50
USPC ......................................................... 455/419
See application file for complete search history.

(56) References Cited

U.S. PATENT DOCUMENTS

| | | | | |
|---|---|---|---|---|
| 2005/0021945 A1* | 1/2005 | Niemi | ................ | H04L 12/1859 713/163 |
| 2008/0090597 A1* | 4/2008 | Celik | ................ | H04M 1/72552 455/466 |
| 2010/0154030 A1* | 6/2010 | Montemurro | ........... | H04L 63/20 726/1 |
| 2012/0108205 A1* | 5/2012 | Schell | ................ | H04L 63/0823 455/411 |
| 2014/0024330 A1* | 1/2014 | Chu | .................. | H04M 1/72541 455/404.1 |
| 2014/0233544 A1* | 8/2014 | McCann | ............... | H04W 48/18 370/338 |
| 2014/0235210 A1* | 8/2014 | Park | ....................... | H04W 12/04 455/411 |
| 2015/0281198 A1* | 10/2015 | Lee | ......................... | H04W 8/18 726/7 |
| 2015/0303966 A1* | 10/2015 | Lee | ..................... | H04B 1/3816 455/466 |

FOREIGN PATENT DOCUMENTS

| | | | | |
|---|---|---|---|---|
| WO | WO-2012076041 A1 * | 6/2012 | ............. | H04L 9/085 |
| WO | WO-2015163623 A1 * | 10/2015 | ........... | H04B 1/3816 |

* cited by examiner

APPARATUS AND METHOD FOR PROFILE INSTALLATION IN COMMUNICATION SYSTEM

CROSS-REFERENCE TO RELATED APPLICATION(S) AND CLAIM OF PRIORITY

This application is a continuation of U.S. patent application Ser. No. 14/943,983 filed on Nov. 17, 2015, which claims priority under 35 U.S.C. § 119(a) to U.S. Patent Application No. 62/080,810 filed on Nov. 17, 2014, the disclosures of which are herein incorporated by reference in their entirety.

TECHNICAL FIELD

The present disclosure relates to a method and apparatus for selecting a communication service to perform communication connection by a User Equipment (UE) in a communication system.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

A Universal Integrated Circuit Card (UICC) corresponds to a smart card used while being inserted into a mobile communication UE, etc., is also referred to as a UICC card. The UICC may include an access control module for access to a network of a mobile communication provider. Examples of the access control module include a Universal Subscriber Identity Module (USIM), a Subscriber Identity Module (SIM), an IP multimedia Service Identity Module (ISIM), etc. The UICC including the USIM may be generally called a USIM card. Likewise, the UICC including the SIM module may be generally called a SIM card. In the following description of the present disclosure, the SIM card will be used as a general meaning including a UICC card, a USIM card, a UICC including an ISIM, etc. That is, when the SIM card is mentioned, the technology can be identically applied to the USIM card, the ISIM card or a general UICC card.

The SIM card stores private information of a mobile communication subscriber, and authenticates the subscriber and creates a traffic security key when the subscriber accesses a mobile communication network, thereby making it possible to safely use the mobile communication.

In a proposal of the present disclosure, the SIM card is generally manufactured as a dedicated card for a specific mobile communication provider in response to a request of the corresponding provider, and is released while authentication information for network access of the corresponding provider, e.g., a USIM application, an International Mobile Subscriber Identity (IMSI), a k value, an OPc value, etc., is stored therein in advance. Thus, the corresponding mobile communication service provider receives a delivery of the manufactured SIM card to provide the same to the subscriber, and thereafter performs the management, such as installation, modification, deletion, and the like, of an application in the UICC using technologies such as Over The Air (OTA), etc. when necessary. The subscriber may insert the UICC card into his/her mobile communication UE to use the network and application services of the corresponding mobile communication service provider, and when replacing the UE, the subscriber may move and insert the UICC card from the existing UE to a new UE to use the authentication information, the mobile communication phone numbers, the personal telephone number list, and the like, which are stored in the UICC card, in the new UE as they are.

However, it is inconvenient for the SIM card to allow a mobile communication UE user to receive a service of another mobile communication provider. There is inconvenience in that the mobile communication UE user should physically acquire the SIM card in order to receive a service from the mobile communication provider. For example, there is inconvenience in that when travelling to other countries, the mobile communication UE user should acquire a local SIM card in order to receive a local mobile communication service. A roaming service can solve the inconvenience to some degree, but a fee thereof is expensive. Further, when a contract between communication providers is not established, it is impossible to receive a service.

Meanwhile, when the SIM module is remotely downloaded to and installed in the UICC card, it is possible to solve such inconvenience considerably. That is, a user can download a SIM module corresponding to a mobile communication service to the UICC card when necessary. Further, such a UICC card can download and install a plurality of SIM modules, and only one SIM module from among them can be selected and used. Such a UICC card may fix the SIM module to a UE or may not fix the SIM module to the UE. In particular, the UICC, which is used while being fixed to the UE, is called an embedded UICC (eUICC). In general, the eUICC implies a UICC card which is used while being fixed to the UE and can remotely download and select the SIM module. In the present disclosure, the UICC card, which can remotely download and select the SIM module, is commonly called the eUICC. That is, the UICC card, which is fixed to or is not fixed to the UE, from among UICC cards which can remotely download and select the SIM module, is commonly called the eUICC. Further, information on the downloaded SIM module is used as a term called an eUICC profile.

SUMMARY

To address the above-discussed deficiencies, it is a primary object to provide an apparatus and method for receiving a service of a mobile communication provider by a user of a UE in a wireless communication system.

A UE in a wireless communication system according to an embodiment of the present disclosure includes a reception unit for receiving a profile from a profile management server, a display unit for displaying the communication service information, and a controller for receiving the profile to be connected to a communication service.

A server for providing a profile in a wireless communication system according to an embodiment of the present disclosure includes a controller for generating and encrypting a profile, and a transmission unit for transmitting the encrypted profile to a server for managing a profile.

A server for managing a profile in a wireless communication system according to an embodiment of the present disclosure includes a reception unit for receiving an encrypted profile from a server for providing a profile, and a transmission unit for performing transfer to a UE using the eUICC.

A method of a UE in a wireless communication system according to an embodiment of the present disclosure includes receiving a profile from a profile management server, displaying the communication service information, and receiving the profile to be connected to a communication service.

A method of providing a profile of a server in a wireless communication system according to an embodiment of the present disclosure includes generating and encrypting a profile, and transmitting the encrypted and generated profile to a server for managing a profile.

A method of managing a profile of a server for managing a profile in a wireless communication system according to an embodiment of the present disclosure includes receiving an encrypted profile from a server for providing a profile, and performing transfer to a UE using the eUICC.

Further, in accordance with an embodiment of the present disclosure, a method of providing a profile package by a profile server is provided. The method includes generating a profile package; dividing the profile package into a unit installable in a UICC of an electronic device, reconfiguring the divided profile information in an encryptable unit; and transmitting the reconfigured profile information to the electronic device.

Further, in accordance with an embodiment of the present disclosure, a profile server for providing a profile package is provided. The profile package includes a transmission/reception unit that transmits/receives a signal, and a controller that generates a profile package, divides the profile package in a unit installable in a UICC of an electronic device, reconfigures the divided profile information in an encryptable unit, and transmits the reconfigured profile information to the electronic device.

Further, in accordance with an embodiment of the present disclosure, a method of downloading a profile package by an electronic device is provided. The method includes receiving, from a profile server, first profile information in an encryptable unit, which constitutes a profile package; transmitting the first profile information in an encryptable unit to a UICC of the electronic device; decoding the first profile information in an encryptable unit, which has been transmitted to the UICC, acquiring first profile information in an installable unit from the decoded profile information; and installing the acquired first profile information in an installable unit.

Further, in accordance with an embodiment of the present disclosure, an electronic device for downloading a profile package is provided. The electronic device includes: a communication unit that transmits/receives a signal, a UICC that downloads and installs a profile; and a controller that makes a control to receive, from a profile server, first profile information in an encryptable unit, which constitutes a profile package, and transmit the first profile information in an encryptable unit to a UICC of the electronic device, wherein the UICC decodes the first profile information in an encryptable unit, which has been transmitted to the UICC, acquires first profile information in an installable unit from the decoded profile information, and installs the acquired first profile information in an installable unit.

The technical problems to be achieved in the present disclosure are not limited to the above-mentioned technical problems, and other not-mentioned technical problems on the basis of the following description could be easily understood by those skilled in the art to which the present disclosure pertains.

In accordance with the present disclosure, in a wireless communication system, a profile, by which a communication service can be used, may be automatically installed in a mobile communication UE.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" or "processor" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
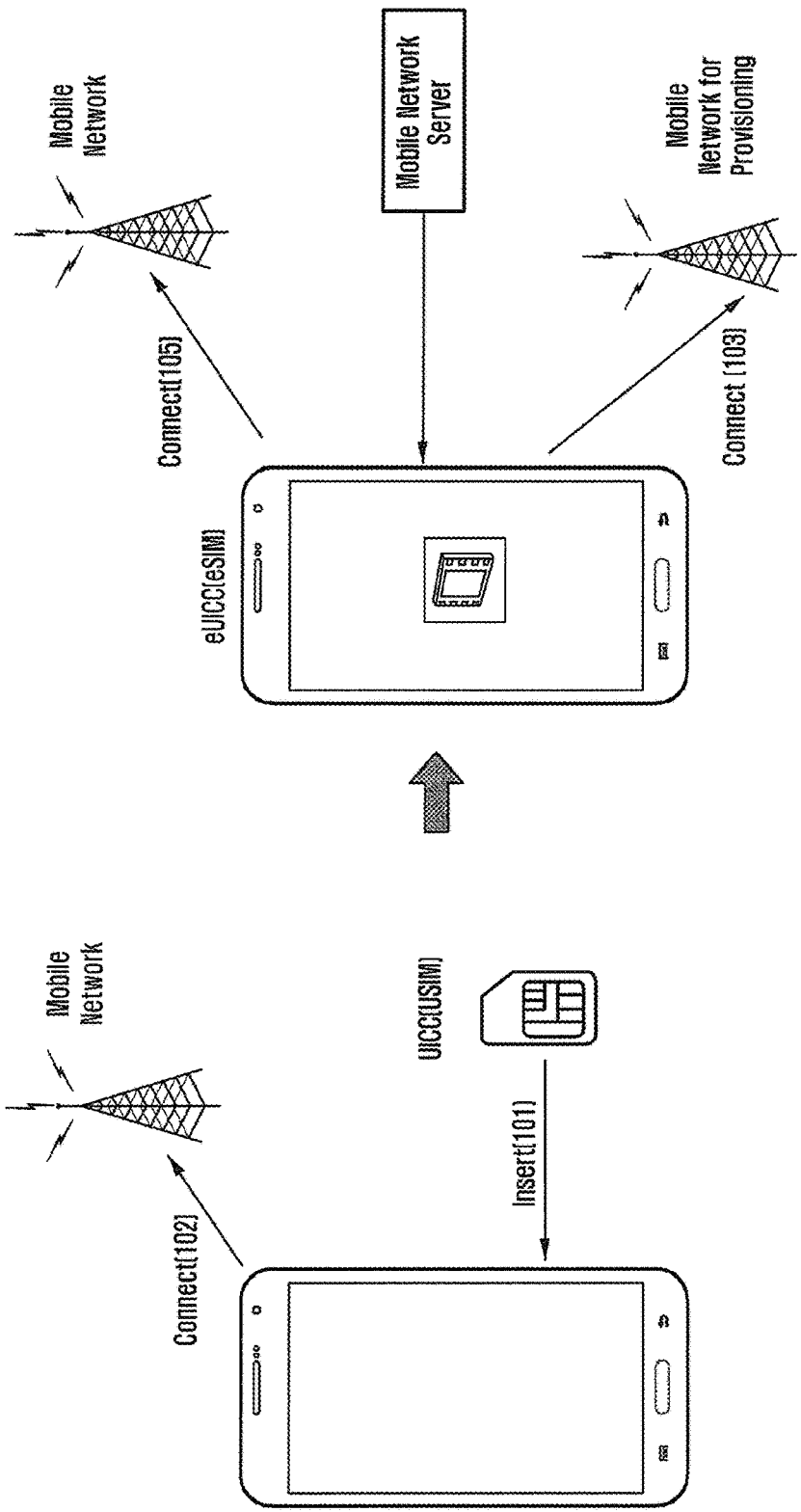
FIG. 1 schematically illustrates a connection method of a mobile communication network by a detachable UICC that can be inserted into and detached from a UE and a connection method of a mobile communication network by an embedded UICC (eUICC) embedded in a UE.

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged telecommunication technologies. Hereinafter, an embodiment of the present disclosure will be described in detail with reference to the accompanying drawings.

In describing embodiments, descriptions of technical features which are widely known in the technical field to which the present disclosure pertains and are not directly related to the present disclosure will be omitted. This is for more clearly describing the subject matter of the present disclosure without obfuscation by omitting unnecessary description.

Specific terms used in the following description are provided to help understanding of the present disclosure, and can be changed to various forms without departing from the technical spirit of the present disclosure.

Further, terms in the present specification will be defined.

In the present specification, the UICC, which is a smart card used while being inserted into a mobile communication UE, implies a chip which stores private information of a mobile communication subscriber, such as network access authentication information, a phone number, and a Short Message Service (SMS), and performs subscriber authentication and traffic security key generation when accessing a mobile communication network such as Global System for Mobile communications (GSM), Wideband Code Division Multiple Access (WCDMA), and Long Term Evolution (LTE), etc., thereby enabling safe use of mobile communication. The UICC has a communication application mounted thereto, such as a Subscriber Identity Module (SIM), a Universal SIM (USIM) and an IP Multimedia SIM (ISIM), and can provide a high level security function for mounting various applications such as an electronic wallet, ticketing, and an electronic passport.

In the present specification, the eUICC is a security module which is not a detachable type chip inserted into and detached from a UE but is a chip embedded in the UE. The eUICC can download and install a profile using the Over The Air (OTA) technology.

In the present specification, a method of downloading a profile in the eUICC using the OTA technology can be applied even to a detachable type UICC which can be inserted into and detached from a UE.

In the present specification, the term "UICC" can be mixedly used with the SIM, and the term "eUICC" can be mixedly used with the eSIM.

In the present specification, the profile can imply a thing obtained by packaging, in a software form, an application, a file system, and an authentication key value, etc. which are stored in the UICC.

In the present specification, the USIM profile can imply the profile identically or a profile obtained by packaging, in a software form, information included in a USIM application within the profile.

In the present specification, an operational profile can imply a thing obtained by packaging, in a software form, subscriber information of a mobile communication provider to which a user of a UE is registered.

In the present specification, a provisioning profile can imply a profile pre-mounted to the eUICC, which is necessary for allowing a UE to access a predetermined mobile communication network of a predetermined country before a user subscribes to a specific communication provider.

In the present specification, a profile provision server can be expressed as a Subscription Manager Data Preparation (SM-DP), an off-card entity of a profile domain, a profile encryption server, a profile generation server, a Profile Provisioner (PP), a Profile Provider, and a Profile Provisioning Credentials holder (PPC holder).

In the present specification, a profile management server can be expressed as a Subscription Manager Secure Routing, an off-card entity of an eUICC profile manager, or a Profile Management Credentials holder (PMC holder).

In the present specification, an eUICC profile manager can be expressed as an ISD-R, a Profile Managing Domain, or the like.

The term "terminal" used in the present specification can be called a mobile station (MS), a User Equipment (UE), a User Terminal (UT), a wireless terminal, an Access Terminal (AT), a terminal, a subscriber unit, a Subscriber Station (SS), a wireless device, a wireless communication device, a Wireless Transmit/Receive Unit (WTRU), a mobile node, a mobile, or other terms. Various embodiments of a UE can include a cellular phone, a smartphone having a wireless communication function, a Personal Digital Assistant (PDA) having a wireless communication function, a wireless MOdulator/DEModulator (MODEM), a portable computer having a wireless communication function, a photographing apparatus such as a digital camera having a wireless communication function, a gaming device having a wireless communication function, a music storage and reproduction home appliance having a wireless communication function, an Internet home appliance capable of wireless Internet access and browsing, and a portable unit or UEs having a combination of the functions. Further, the UE can include a Machine-to-Machine (M2M) UE and a Machine Type Communication (MTC) UE/device, but the present disclosure is not limited thereto.

In the present specification, an electronic device can include a UICC embedded therein which is able to download and install a profile. When the UICC is not embedded in the electronic device, the UICC, physically separated from the electronic device, can be connected to the electronic device while being inserted into the electronic device. For example, the UICC can be inserted into the electronic device in a form of a card. The electronic device can include the UE. At this time, the UE can be a UE including a UICC which can download and install a profile. The UICC can be embedded in the UE, and when the UE and the UICC are separated from each other, the UICC can be inserted into the UE, and can be connected to the UE while being inserted into the UE. The UICC which can download and install a profile can be called, for example, an eUICC.

In the present specification, a profile identifier can be referred to as a factor matched with a Profile ID, an Integrated Circuit Card ID (ICCID), and an Issuer Security Domain-Profile (ISD-P). The Profile ID can indicate a unique identifier of each profile.

In the present specification, an eUICC ID can be a unique identifier of an eUICC embedded in a UE and can be referred to as an EID. Further, when a provisioning profile is mounted to the eUICC in advance, the eUICC ID can be a profile ID of the corresponding provisioning profile. Further, when the UE and an eUICC (or eSIM) chip are not separated from each other as in an embodiment of the present disclosure, the eUICC ID can be a UE ID. Further, the eUICC ID can be referred to as a specific secure domain of the eSIM chip.

In the present specification, a profile container can be named a profile domain. A profile container can be a security domain.

In the present specification, an Application Protocol Data Unit (APDU) can be a message for allowing a UE to interwork with an eUICC. Further, the APDU can be a message for allowing a PP or a PM to interwork with the eUICC.

In the present specification, Profile Provisioning Credentials (PPC) can be a means used for mutual authentication between a PP and an eUICC, profile encryption, and a signature. A PPC can include one or more of a symmetric key, an RSA authentication certificate and a private key, an ECC authentication certificate and a private key, and a Root CA and an authentication certificate chain. Further, when there are a plurality of PPs, a different PMC for each of a plurality of PMs can be stored in the eUICC or can be used.

In the present specification, Profile Management Credentials (PMC) can be a means used for mutual authentication between a PM and an eUICC, transmission data encryption, and a signature. A PMC can include one or more of a symmetric key, an RSA authentication certificate and a private key, an ECC authentication certificate and a private key, and a Root CA and an authentication certificate chain. Further, when there are a plurality of PMs, a different PMC for each of a plurality of PMs can be stored in the eUICC or can be used.

In the present specification, AID can be an application identifier. This value can be an identifier by which different applications within the eUICC are identified.

In the present specification, TAR can be a Toolkit Application Reference. This value can be an identifier by which a Toolkit Application is identified.

In the present specification, a Profile Package TLV can be named a Profile TLV. The profile Package TLV can be a data set which expresses information constituting a profile in a form of a TLV (Tag, Length, Value).

In the present specification, AKA can indicate Authentication and Key Agreement, and can indicate an authentication algorithm for accessing a 3GPP and 3GPP2 network.

In the present specification, K corresponds to an encryption key value stored in the eUICC used for an AKA authentication algorithm.

In the present specification, OPc corresponds to a parameter value stored in the eUICC used for the AKA authentication algorithm.

In the present specification, NAA, which is a Network Access Application program, can be an application program such as USIM or ISIM, which is stored in the UICC in order to access a network. NAA can be a network access module.

In the present specification, AMF can be an authentication management field value.

In the present specification, SQN can be a sequence number value.

In the present specification, L is a value which can be stored in NAA, and can be a parameter used at a time of SQN verification during an AKA authentication process.

In the present specification, a delta value is a value which can be stored in NAA, and can be a parameter used at a time of the SQN verification during the AKA authentication process.

Further, in the following description of the present disclosure, a detailed description of related known functions or configurations incorporated herein will be omitted when it can make the subject matter of the present disclosure rather unclear.

FIG. 1 schematically illustrates a connection method of a mobile communication network by a detachable UICC in the art that can be inserted into and detached from a UE and a connection method of a mobile communication network by an embedded UICC (eUICC) embedded in a UE.

Referring to FIG. 1, a detachable UICC can be inserted into a UE (as indicated by reference numeral 101). A profile can be mounted to a detachable UICC in advance. The UE can be connected to a mobile network using the mounted profile (as indicated by reference numeral 102).

The UE has an eUICC embedded therein. An eUICC can have a provisioning profile mounted thereto in advance. The UE can access a mobile network for provisioning using the mounted provisioning profile. The UE can download a profile from a mobile network server by accessing a temporary mobile network for provisioning. The temporary mobile network is a mobile network for downloading a profile. The UE can install the downloaded profile and can be connected to the mobile network using the profile (as indicated by reference numeral 105).

Figure 2:
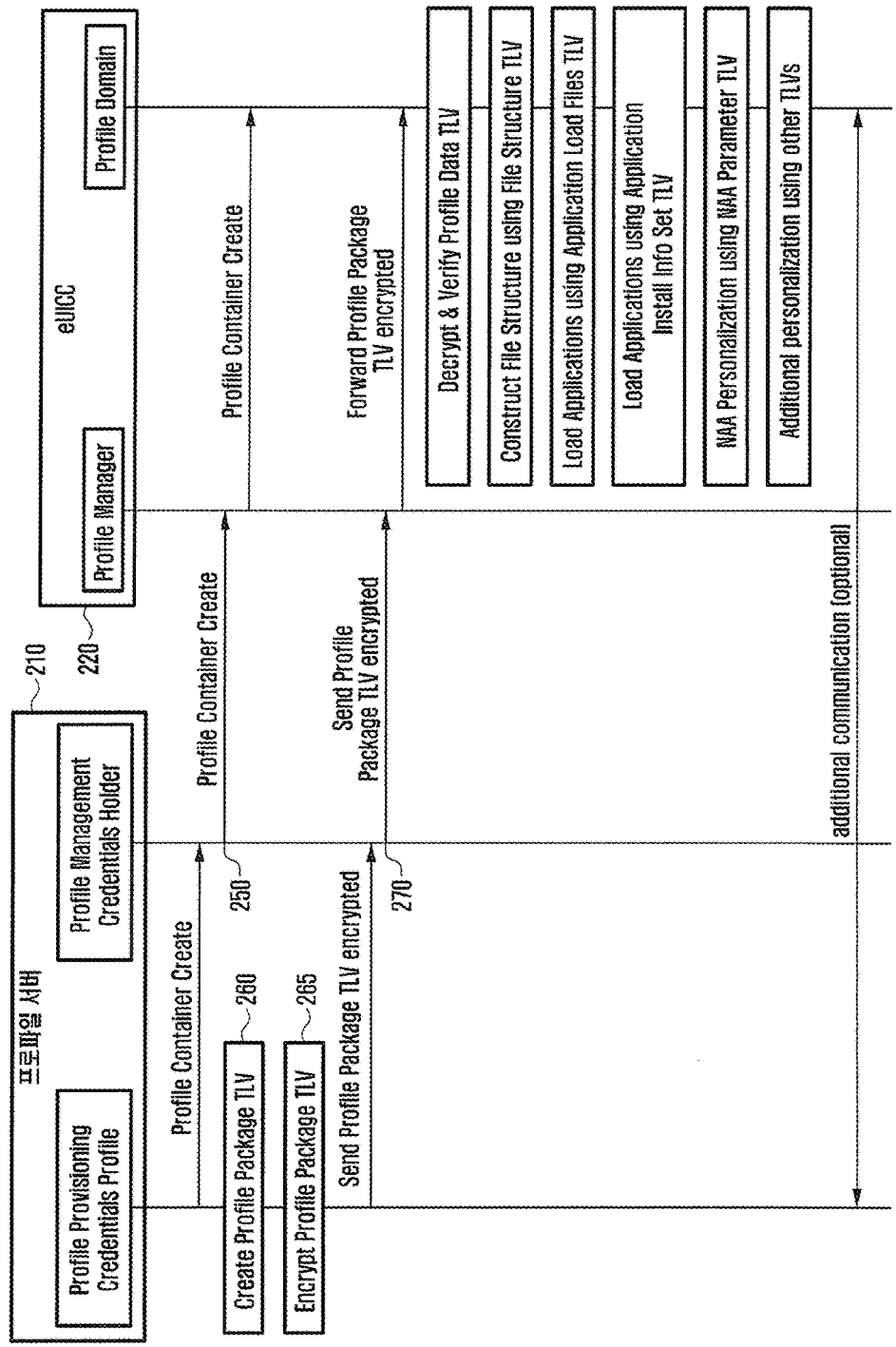
FIG. 2 is a signal flow diagram illustrating a process of installing a profile in a wireless communication network according to an embodiment of the present disclosure.

FIG. 2 illustrates an embodiment of installing a profile in a wireless communication network according to an embodiment of the present disclosure. The profile server 210 can include a PP and a PM. The eUICC 220 can include a profile manager and a profile domain. Thus, an operation of a PP and a PM, which will be described below, can be performed by a profile server 210, and an operation of a profile manager and a profile domain can be performed by an eUICC.

Referring to FIG. 2, in operation 250, the profile server 210 can request generation of a profile container from the eUICC 220. PP can perform a profile container generation request for a specific eUICC while communicating with the PM. The profile container generation request can be a profile download request command. Encrypted communication can be used between the PP and the PM, and the encrypted communication can be used by configuring a symmetric key or can be used in an authentication certificate scheme. First, as an example of the authentication certificate-based encrypted communication, when the PP generates an encryption symmetric key, encrypts the generated encryption symmetric key by a public key of the PM, and transmits the encrypted symmetric key to the PM, the PM decodes the encryption symmetric key by a private key of the PM, and then commercially uses the corresponding symmetric key for the encrypted key with the PP.

The Profile Container Create command can be transmitted while being included in an HTTP message. The PM, which has received the Profile Container Create command, can request the Profile Container Create (or can be expressed as Profile generation, Profile Domain generation, or the like) while communicating with the eUICC. As an example, in this process, the PM can use an SMS message in order to communicate with the eUICC. In detail, the PM can allow the eUICC to include APDU, which implies the Profile Container Create, in an SMS-PP message. One example of such an APDU message can include a PUSH APDU command. Another example of such an APDU message can be a STORE message. Further, when generating the SMS-PP message, the PM can encrypt the APDU message. At this time, an encryption key to be used can be shared between the PM and the eUICC and stored. The Profile Container generation request can be firstly transmitted to a mobile communication UE, and the mobile communication UE generates an APDU message and transmits the APDU message to the eUICC.

Further, the message transmission between the PM and the eUICC can be performed using an HTTP message. In detail, a TLS communication channel is established between the PM and the eUICC using a symmetric key or an authentication certificate which is previously generated and stored, and a message can be then transmitted using the HTTP message. In this way, when not SMS but HTTP is used, there is an advantage in that IP communication using a mobile communication network can be used or a communication between the PM and the eUICC can be performed using an IP network which utilizes Wi-Fi or Bluetooth.

The Profile Container Create request message, which has been transmitted from the PM, can be processed by an eUICC Profile Manager within the eUICC. An eUICC Profile Manager can decode a communication message including the request to one value from among the PMCs stored in the eUICC and verify the decoded value using a configuration value, and when the verifying is passed, generate a Profile Container within the eUICC. A memory necessary for generating the Profile within the eUICC, an AID value, or the like can be allocated to a Profile Container.

Meanwhile, the PP can generate (as indicated by reference numeral 260) and encrypt (as indicated by reference numeral 265) the Profile Package TLV in order to install the Profile in the Profile Container generated in the eUICC. The profile server 210 can generate a profile package (operation 260). The profile package can have a Tag Length Value (TLV) form. The profile package having a TLV form can be named a profile package TLV. The profile server 210 can generate a profile package divided into n pieces of information in an installable unit. Further, the profile server can divide the profile package into information in an installable unit after generating the profile package. The information in an installable unit, which is information configured to be installed in the eUICC even though the entire profile package is not transmitted to the eUICC when the information is transmitted to the eUICC 220, can imply a part of the entire profile package information.

The profile server 210 can encrypt the generated profile package (operation 265). The profile server can encrypt a profile package, configured by n pieces of information in an installable unit, to m pieces of information in an encryptable unit. The n and the m can be equal to each other or can be different from each other. The profile server 210 can transmit the profile package configured in an encryptable unit, to the electronic device. The profile server can configure the profile package, configured in an encryptable unit, in a transmittable unit, and then transmit the profile package to the electronic device. At this time, the transmittable unit can correspond to a size in which the electronic device having received the profile package can transmit the received profile package to a UICC of the electronic device. For example, the transmittable unit can be a data unit of the APDU.

Hereinafter, a procedure of generating a Profile Package TLV by a PP will be described.

However, the TLV form is merely an example of the profile package, and in an embodiment of the present disclosure, a form of the profile package is not limited to the TLV form. Table 1 illustrates a structure of the Profile Package TLV. Here, a scheme of recording data in a Tag-Length-Value form can be commonly called a TLV. The Profile Package TLV can be named a Profile TLV. Referring to Table 1, a Name field in the table corresponds to a name of the TLV and is not a value actually included in data. In a case of an M/O/C field, a value of M implies that data is necessarily included, a value of O implies that data can not be included, and a value of C implies that data is conditionally included. The M/O/C field can not be a value actually included in data. However, the M/O/C field can be stored in a source code within the eUICC and used to verify the effectiveness of the corresponding data.

TABLE 1

Profile Package TLV Structure

| Name | M/O/C | Tag | Length | Value |
|---|---|---|---|---|
| Profile Package | M | A1 | L1 | Coded as in Table 1-1 |

In Table 1, a Tag value of the Profile Package TLV, which is a data value having a size of 1 byte, is expressed as A1 in Table 1. The A1 value can adopt one selected from 256 values from "00" to "FF" in a hexadecimal form. For example, the A1 value can be "8E".

In Table 1, a Length value of the Profile Package TLV is a value indicating the length of data stored in a Value field of the Profile TLV, and the length of the Length file can be fixed or configured to be 2 bytes or 3 bytes. As an example, when the length of the length field is fixed to 3 bytes, a value of the Length field can have a value of "000000"-"FFFFFF" in a hexadecimal form, and thus, can represent maximally the data length of 2^24-1 bytes or 16M-1 bytes. As an example, a value of the Length field, which is "020001", indicates that the length of the Value field is 128K bytes. Further, as an example, when the length of the length field is fixed to 2 bytes, a value of the Length field can have a value of "0000"-"FFFF" in a hexadecimal form, and thus, can represent maximally the data length of 2^16-1 bytes or 64K-1 bytes.

The Value field of the Profile Package TLV in Table 1 includes various pieces of information for installing a profile, and data is configured using the corresponding information as in Table 1-1.

Referring to Table 1-1, the Value field of the Profile TLV can include File Structure TLV data. The File Structure TLV is data for including a file structure, an attribute, and a file content of the profile. A Tag value of the File Structure TLV, which is a data value having a size of 1 byte, is expressed as A2 in Table 1-1. The A2 value can adopt one selected from 256 values from "00" to "FF" in a hexadecimal form. For example, the A1 value can be "01".

TABLE 1-1

Structure of value part of Profile Package TLV

| Name | M/O/C | Tag | Length | Value |
|---|---|---|---|---|
| File Structure | M | A6 | 1~n bytes | Coded as in Table 2 |
| NAA Parameters | M | '00'~'FF' | 1~n bytes | Coded as in Table 3 |
| NAA Parameters | O | '00'~'FF' | 1~n bytes | Coded as in Table 3 |
| ... | O | '00'~'FF' | | |
| Load File Package | O | '00'~'FF' | 1~n bytes | Coded as in Table 4 |
| Load File Package | O | '00'~'FF' | 1~n bytes | Coded as in Table 4 |
| ... | | | | |
| RFU | | | | |

In Table 1-1, a Length value of the File Structure Data TLV is a value indicating the length of data stored in a Value field of a File Structure TLV, and the length of the Length file can be fixed or configured to be 2 bytes or 3 bytes. When the length of the length field is fixed to 3 bytes, a value of the Length field can have a value of "000000"-"FFFFFF" in a hexadecimal form, and thus, can represent maximally the data length of 224-1 bytes or 16M-1 bytes. For example, a value of the Length field, which is "020001", indicates that the length of the Value field is 128K bytes. Further, when the length of the Length field is fixed to 2 bytes, a value of the Length field can have a value of "0000"-"FFFF" in a hexadecimal form, and thus, can represent maximally the data length of 216 bytes or 64K bytes. A Value of the File Structure Data TLV can include various pieces of File information, and a structure thereof can be a data structure as in Table 2.

TABLE 2

Structure of Value part of File Structure TLV

| Name | M/O/C | Tag | Length | Value |
|---|---|---|---|---|
| File | M | A6 | 1~3 bytes | Coded as in Table 2-1 for MF, DF, or ADF |
| File | O | A6 | 1~3 bytes | Coded as in Table 2-1 for DF, or ADF and as in Table 2-2 for EF |
| ... | ... | ... | ... | ... |
| File | O | A6 | 1~3 bytes | Coded as in Table 2-1 for DF, or ADF and as in Table 2-2 for EF |

Referring to Table 2, a Value of the File Structure TLV can include at least one or more pieces of File TLV data. Each File TLV can include data of an MF file, a DF file, an ADF file, or an EF file. Here, the MF file implies a Master File or a Master DF file, and the DF file implies a Dedicated File, and the ADF file implies an Application Dedicated File, and the EF file implies an Elementary File. In one File Structure TLV, there can be one File TLV including MF file information or there can be no File TLV including MF file information. A Tag value of the File TLV, which is a data value having a size of 1 byte, is expressed as A6 in Table 2. The A6 value can adopt one selected from 256 values from "00" to "FF" in a hexadecimal form. For example, the A6 value can be "02". The Length value of the File TLV can be used while being fixed to 1 byte or 2 bytes or configured to be another value. A Value part of the File TLV can be generated in a data structure as in Table 2-1 or Table 2-2. When the File TLV includes information on an MF file, a DF file, or an ADF file, data of a Value part of the corresponding File TLV can be configured as in Table 2-1, and when the File TLV includes information on an EF file, data of a Value part of the corresponding File TLV can be configured as in Table 2-2.

TABLE 2-1

Strucure of Value part of File TLV including informaiton on MF file, DF file, and ADF file

| Value | M/O/C | Description | Length |
|---|---|---|---|
| A6 | M | Tag: File | 1 byte |
|  |  | Length of File (next byte to the end) | 1~n bytes |
|  | M | FCP Template TLV coded as in TS 102.222 (see note) | 1~n bytes |
| A7 | O | Tag: File Path | 1 byte |
|  |  | Length of File Path | 1 byte |
|  |  | File Path Bytes (concatenation of File ID) | 2 × n bytes |

NOTE:
FCP Template TLV is exactly same one for CREATE command in ETSI TS 102.222.
If MF, File ID in FCP Template TLV shall be coded as '3F00' and File type bits of File descriptor byte (i.e. b6, b5 and b4) in FCP Template TLV shall be coded as '111'

Referring to Table 2-1, when the File TLV includes information on the MF file, the DF file, or the ADF file, the file TLV can include FCP Template TLV and File Path TLV data below a Tag and Length field. The FCP Template TLV can use a value including information on a File ID, etc. as a File Control Parameter TLV having an ETSI TS 102.222 standard. The File Path is a value indicating a file path of the corresponding File TLV, and is, for example, a value expressing a File ID. A File Path TLV can be included or not included in the File TLV. When the File Path is not included, the determination can be performed even without the File Path of the corresponding file. For example, when a File TLV corresponding to the DF file and a File TLV corresponding to the EF file are connected to each other within the File Structure TLV, and a File TLV corresponding to the EF file does not include a File Path TLV, a File can be generated in a state in which the corresponding EF file is considered as the EF file included below the DF file. When the File is generated using such a scheme, the size of profile data to be transmitted can be reduced by reducing information on the File Path.

TABLE 2-2

Structure of Valve part of File TLV including information on EF file

| Value | M/O/C | Description | Length |
|---|---|---|---|
| A6 | M | Tag: File | 1 byte~n bytes |
|  |  | Length of File (next byte to the end) | 1 bytes~n bytes |
|  | M | FCP Template TLV coded as in TS 102.222 | 1~n bytes |
| A7 | O | Tag: File Path | 1 byte~n bytes |
|  |  | Length of File Path | 1 byte~n bytes |
|  |  | File Path Bytes (concatenation of File ID) | 2 × n bytes |
| A8 | C2 | Tag: File Binary | 1 byte~n bytes |
|  |  | Length of File Binary | 1 byte~n bytes |
|  |  | File Binary | 1 byte~n bytes |
| A9 | C3 | Tag: File Records Sequence | 1 byte~n bytes |
|  |  | Length of File Records Sequence | 1 byte~n bytes |
|  |  | File Records Sequence | 1 byte~n bytes |
| B1 | C4 | Tag: File Data | 1 byte~n bytes |
|  |  | Length of File Data | 1 byte~n bytes |
|  |  | File Data | 1 byte~n bytes |

C2: File Binary TLV is used for transparent EFs.
C3: File Records Sequence TLV is used for linear fixed or cyclic EFs.
C4: File Data TLV is used for BER-TLV EFs.

Referring to Table 2-2, when the File TLV includes information on the EF file, the File TLV can include an FCP Template TLV and a File Path TLV below the Tag and Length field, and can additionally include one of the following three TLVs without exception:
File Binary TLV;
File Records Sequence TLV;
File Data TLV.

When the EF file has a Transparent structure, the File TLV includes a File Binary TLV from among the above three TLVs, and a Value of the File Binary TLV can have a binary form.

When the EF file has a Linear Fixed structure or a Cyclic structure, the File TLV includes a File Records Sequence TLV from among the above three TLVs, and a Value of the File Records Sequence TLV can be a value concatenated by attaching a sequence byte to Record data included in the EF file. Table YY illustrates a structure of the File Records Sequence TLV. In the File Records Sequence TLV, a Tag value, a Length value, a Records Number byte, and Records data are connected. Table 2-3 illustrates that three Records are updated to the EF file. For example, when the EF file corresponds to a linear fixed type configured by 10 Records, and only three Records from among the ten Records are updated, the File Records Sequence TLV is configured as in Table 2-3. At this time, Records Number can be a value indicting an ordinal sequence of a specific record among the total records.

TABLE 2-3

| Value | M/O/C | Description | Length |
|---|---|---|---|
| A9 | C3 | Tag: File Records Sequence | 1 byte~n bytes |
|  |  | Length of File Records Sequence | 1 byte~n bytes |
|  |  | Records Number | 1 byte |
|  |  | Records | 1 byte~n bytes |
|  |  | Records Number | 1 byte |
|  |  | Records | 1 byte~n bytes |
|  |  | Records Number | 1 byte |
|  |  | Records | 1 byte~n bytes |

When the EF file has a BER-TLV structure, the File Data TLV from among the three TLVs is included, and the File Data TLV can be data of which values are configured by a TLV structure.

TABLE 3

Structure of Value part of NAA Parameter TLV

| Name | M/O/C | Tag | Length | Value |
|---|---|---|---|---|
| NAA Type | M | TBD | 1 bytes | '01': USIM |
|  |  |  |  | '02': ISIM |
|  |  |  |  | '03'~: FFS |
| MILENAGE Parameter | C1 | TBD | 1 byte~n bytes | ... |
| TUAK Parameter | C2 | TBD | 1 byte~n bytes | ... |
| Native NAA Indicator | O | TBD | 1 bytes | '01': Use NAA provided by the eUICC platform |
|  |  |  |  | '02': Use NAA downloaded in the Load File Package TLV |
| RFU |  |  |  |  |

C1: If MILENAGE isn't supported by the eUICC platform, the MILENAGE Parameter TLV shall not be included.
C2: If TUAK isn't supported by the eUICC platform, the TUAK Parameter TLV shall not be included.

Referring back to Table 1-1, value data of the Profile Package TLV can include one or more NAA Parameter TLVs. A Tag value of such an NAA Parameter TLV can adopt one selected from 256 values from "00" to "FF" in a hexadecimal form.

Referring to Table 3, an NAA Type TLV can be inserted into a Value area of such an NAA Parameter TLV. A Value of the NAA Type TLV corresponds to a value determining a network access module type such as a USIM or an ISIM. As an example, in a case of USIM, the Value can be "01", and in a case of ISIM, the Value can be "02". Further, in a case where the NAA supports a MILENAGE algorithm, a MILENAGE Parameter TLV can be included. As an example, the MILENAGE Parameter TLV can include a K value, an OPc value, an r1-r5 value, and a c1-c5 value. Further, in a case where the NAA supports a TUAK algorithm, a TUAK Parameter TLV can be included. As an example, the TUAK Parameter TLV can include a K value, an OPc value, and an RES length value.

Meanwhile, the NAA Parameter TLV can include a Native NAA Indicator TLV. This value notifies whether the network access module is installed using a network access module application program provided by an eUICC Platform or the network access module is installed using a network access application program transmitted while being included in a Load File Package TLV described below, when the corresponding profile is downloaded and the network access module is then installed. In the former case (i.e., when the profile is downloaded and the network access module is then installed, the network access module application program is provided by the eUICC Platform.), only an AKA authentication logic provided by the eUICC Platform can be used. However, in the latter case, (i.e., the network access module is installed using the network access application program transmitted while being included in the Load File Package TLV), an AKA authentication mechanism can be downloaded while being included in an application program included in the profile and installed. Meanwhile, in the latter case, a core authentication function provided by an OS or a platform of the eUICC can be used.

As an example, the latter has an advantage in that a method of verifying a Sequence Number by a UICC during AKA authentication is included in an application program, and different methods can be used according to business operators. As another example, during the AKA authentication, an authentication algorithm and an authentication key (e.g., a K value) can be differently configured and used according to an AMF value.

Meanwhile, such a TLV can include a configuration value for personalization of the NAA. Examples of such a configuration value can include an encryption key value such as a K value, an OPc value, etc., and an AKA algorithm parameter value. The AKA algorithm parameter value can include a configuration value such as an L value or a delta value used when a SeQuential Number (SQN) value is verified. Further, as an example of such a configuration value, an algorithm identifier according to the AMF value, an encryption value according to the AMF value, etc. can be configured.

Referring back to Table 1-1, value data of the Profile Package TLV can include a Load Files Package TLV. The Load File Package TLV corresponds to a TLV including an installation file and installation information for one or more application programs executed by the eUICC. Table 4 illustrates a structure of the Value part of the Load File Package TLV.

TABLE 4

| Name | M/O/C | Tag | Length | Value |
|---|---|---|---|---|
| Load File | O | TBD | 2 bytes~n bytes | ... |
| Application Install Info | M | TBD | 2 bytes~n bytes | ... |
| ... | ... | ... | ... | ... |
| Application Install Info | O | TBD | 2 bytes~n bytes | ... |

Referring to Table 4, a value of the Load File Package TLV can include one Load File TLV and one or more Application Install Info TLVs. The Load File TLV can include one or more pieces of installation file information of an application program. The Application Install Info TLV includes information for installing an application program using an installation file of the application program included in the Load File TLV or an installation file previously stored. As an example, this value can include an AID value of Secure Domain.

Referring back to FIG. 2, the PP can generate the Profile Package TLV and then encrypt the generated Profile Package TLV using the Profile Provisioning Credentials. Further, the encrypted Profile Package TLV can be signed using a symmetric key or an authentication certificate private key. Then, the PPC holder can transmit an encrypted Profile TLV and an encrypted signature value to the PMC holder, and the PMC holder can transmit the same to the Profile Manager of the eUICC 220 (as indicated by reference numeral 270). The profile server 210 can transmit the profile package configured by information encrypted in an encryptable unit, to the eUICC 220. The profile package can be configured as m pieces of information encrypted in an encrytable unit. The information encrypted in an encryptable unit can include profile package information divided in an installable unit.

Then, the eUICC 220 Profile Manager can transmit the same to the Profile Container. Then, the Profile Container can receive the same, and then verify whether data is modulated, using a signature value. When the verification is passed, the Profile Container can decode an encrypted Profile Package TLV. Next, the Profile Container generates a File Structure inside the Profile Container using the File Structure TLV within the Profile Package TLV. Further, the Profile Container can store an installation file or Load files in a storage place of the eUICC 220 using the Load File Package TLV within the Profile Package TLV, and install the stored Load files or an application from a Load module previously stored in the eUICC in the interior of the Profile Container using the Application Install Info TLV within the Load File Package TLV. Further, the Profile Container can install an NAA application using the NAA Parameter TLV or generate an Instance of the NAA application.

The electronic device can receive the profile package encrypted in an encryptable unit, from the profile server 210. The electronic device can divide the received profile package in a unit transmittable to the eUICC 220 and transmit the divided profile packages to the eUICC 220. The eUICC 220 can receive profile package information divided and encrypted in a transmittable unit. The eUICC 220 can combine the profile package information, divided in a transmittable unit, in an encryptable or decodable unit. The encryptable unit and the decodable unit can be identical to each other. That is, the eUICC 220 can decode the information divided in a transmittable unit by combining the information with the profile package information in an encryptable unit before the division. The eUICC 220 can decode the profile package information, combined in an encryptable unit. The eUICC 220 can identify the decoded profile package information as information in an installable unit and combine the information. The eUICC 220 can start to install the profile package information in an installable unit. That is, the eUICC 220 can start to preferentially install the profile package with respect to the profile package information in an installable unit when the profile package information in an installable unit is included as a result of the decoding. Remaining information, excluding the profile package information in an installable unit, within the decoded information can be stored in a buffer. The eUICC 220 additionally receives profile package information in a transmittable unit, combines the profile package information in a transmittable unit in an encryptable unit, and decodes the combined information. The eUICC 220 combines the decoded information on the profile and the remaining profile package information stored in the buffer and identifies the profile package information in an installable unit. The eUICC 220 preferentially installs the profile package information in an installable unit and stores the remaining profile package information in the buffer.

Further, the Profile Package TLV can include the NAA application itself. In this case, the eUICC 220 can determine whether a previously-stored NAA application is used or an NAA application included in the Profile TLV is used. As an example, when an NAA application is included in the Profile Package TLV, the eUICC 220 can preferentially use the corresponding NAA application. As another example, the Profile TLV can include identifier information by which the NAA application can be selected, and the eUICC 220 can determine whether the NAA application included in the Profile TLV is used or the previously-stored NAA application is used, using the value.

Further, the eUICC 220 can perform additional Personalization using an additional TLV value in the Profile Package TLV. As an example, the eUICC 220 can configure a PIN value and a PUK value using data within the Profile Package TLV.

Figure 3:
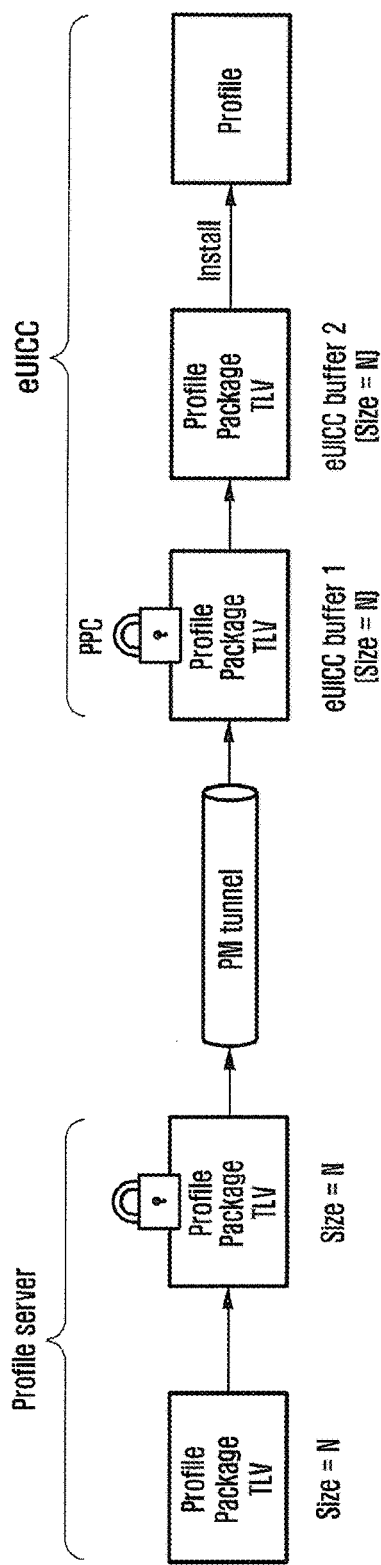
FIG. 3 illustrates a process of transmitting a profile package according to an embodiment of the present disclosure.

FIG. 3 illustrates a process of transmitting a Profile Package TLV according to an embodiment of the present disclosure. First, the Profile Package TLV can be generated in the profile server. For convenience, the size of data of the Profile Package TLV is called N. As an example, N can be several hundreds of kBytes. Thereafter, the profile server can encrypt the Profile Package TLV using the Profile Provisioning Credential, and include a signature value for an integrity check if necessary. In general, the size of encrypted data can be equal to or slightly larger than the size of plain text data. At this time, it is assumed in the present embodiment that the sizes are equal to each other. Thereafter, the PP transmits the encrypted Profile Package TLV to the PM. Thereafter, data is safely transmitted between the profile server and the eUICC using encryption communication using the PMC credential between the eUICC and the PM. FIG. 3 illustrates this process as a PM tunnel. The eUICC can store the Profile Package TLV in a storage place for storing the encrypted Profile Package TLV. For convenience, this is called eUICC buffer 1. The size of the eUICC buffer 1 is minimally equal to or larger than N. Thereafter, the eUICC decodes the Profile Package TLV, and then stores a plain text Profile Package TLV in a temporary storing place. For convenience, the storage place is called eUICC buffer 2. The size of the eUICC buffer 2 is minimally equal to or larger than N. Thereafter, the eUICC can install a Profile in the Profile Container using the plain text Profile Package TLV.

Since the above-described method completely transmits the entire Profile data to the eUICC and then decodes the Profile data, it can be identified that a buffer storage place having the size larger than twice that of the storage place is necessary in addition to the storage place. Further, even when there is an error in the plain text Profile Package TLV data, the eUICC can discover the error only after the entire data is transmitted to the eUICC and is then decoded, so that much inconvenience is predicted. As an example, a time of several minutes is consumed to transmit the profile data to the eUICC, and when the profile is downloaded, even if there is an error in the corresponding Profile Package TLV, a time of several minutes is consumed to discover the error and transmit an error message by the eUICC.

Figure 4:
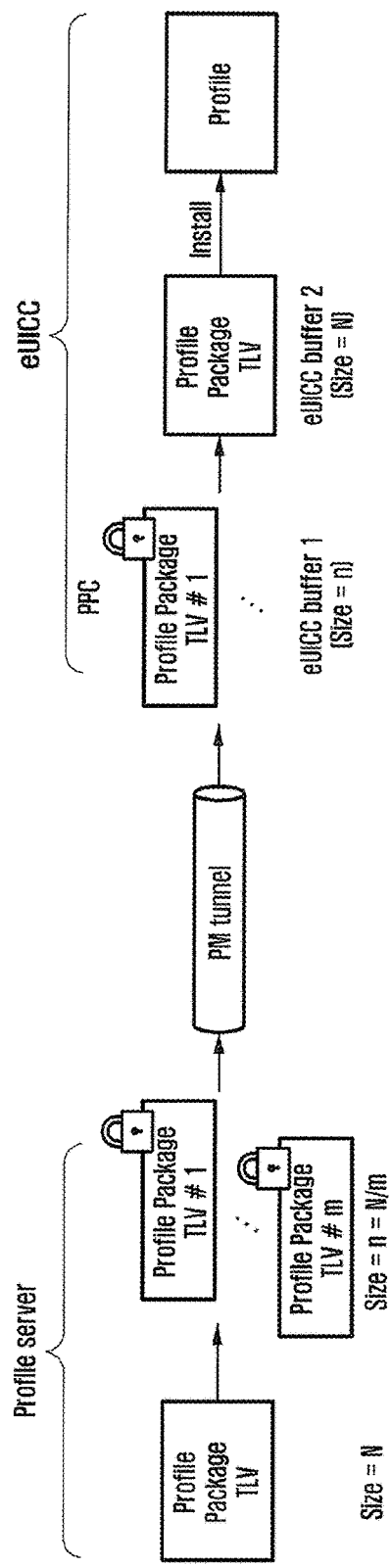
FIG. 4 illustrates a method of dividing and transmitting a profile package according to an embodiment of the present disclosure.

FIG. 4 illustrates a method of dividing and transmitting a profile package according to an embodiment of the present disclosure. Referring to FIG. 4, the Profile Package TLV can be generated in the profile server. For convenience, the size of data of the Profile Package TLV is called N. As an example, N can be several hundreds of Kbytes.

The profile server can divide the Profile Package TLV into m parts to generate m Profile Package TLVs, and encrypt each of them using the Profile Provisioning Credential. When dividing the profile package into m parts, the profile server can divide the profile package into information in a unit installable in the eUICC. The profile server can encrypt the profile package, which has been divided into m pieces of installable information, in a transmittable unit. For convenience, the size of data of the encrypted and divided Profile Package TLV is called n. As an example, when N is 100 Kbytes and m is 10, n can be 10 Kbytes. Thereafter, the PP can transmit the m encrypted and divided Profile Package TLVs to the PM. Then, the profile server can transmit the encrypted and divided Profile Package TLVs to the eUICC one by one or can transmit the Profile Package TLVs together. When the Profile Package TLVs are transmitted one by one, the size of the eUICC buffer 1 for storing the encrypted Profile Package TLVs should be minimally equal to or larger than n. Thereafter, the eUICC decodes the Profile Package TLV, and then stores a plain text Profile Package TLV in a temporary storing place. For convenience, the storage place is called eUICC buffer 2. Thereafter, the eUICC acquires information on the divided plain text Profile Package TLV. Thereafter, the eUICC can install a part of the entire profiles using information on the divided Profile Package TLVs, or can install the profiles after the divided Profile Package TLVs are merged with each other to generate one Profile Package TLV. The eUICC can receive profile package information divided in a transmittable unit, and combine the divided profile package information in an encrytable unit. The eUICC can decode the information combined in an encryptable unit. When the profile package information in an installable unit is included as a result of decoding the profile package information combined in an encryptable unit, the eUICC can install the profile package information in an installable unit. Remaining information excluding the profile package information in an installable unit can be stored in the buffer. The eUICC additionally receives profile package information, divided in a transmittable unit, and combines and decodes the additionally-received information in an encryptable unit as above. The eUICC can combine the decoded profile package information and the remaining information stored in the buffer and identify the combined information as information in an installable unit. The eUICC starts to install the profile package information in an installable unit and stores the remaining profile package information in the buffer. After receiving the divided profile information, the eUICC verifies the TLV information after receiving the information on the divided profiles. When an error is discovered in the TLV information, the eUICC can select the entire Profile Package TLVs or some of the divided Profile Package TLVs among the entire Profile Package TLVs and request retransmission thereof. As an example, such a method of verifying a TLV can include the following methods:

When an unrecognized tag is included, it is recognized that there is an error;
When a Value area is short or large as compared with the size of Length, it is recognized that there is an error;
When a range of Value corresponds to an unrecognized value, it is recognized that there is an error.

Meanwhile, as illustrated in FIG. 4, when the Profile Package TLV is divided and transmitted, the size of the eUICC buffer 1 can be reduced as compared with a case where the Profile Package TLV is transmitted while being not divided as illustrated in FIG. 3. As an example, when m=10, the size of the eUICC buffer 1 can be reduced to ⅒.

As illustrated in FIG. 4, when the Profile Package TLV is divided and transmitted, the eUICC should be able to recognize that the corresponding Profile Package TLV is divided and be able to recognize the number by which the Profile Package TLV is divided and an ordinal sequence of the divided Profile Package TLV.

Referring to Table 1-2, in order to express information on the divided Profile Package TLVs, in an embodiment of the present disclosure, a Split Number TLV and a Split Total Number TLV can be optionally added to a Value part of the Profile Package TLV.

The Split Number TLV implies the total number of the divided Profile Package TLVs (m value in FIG. 4), and the Split Number TLV indicates an ordinal sequence of a specific divided Profile Package TLV including the corresponding Split Number TLV from among the entire divided Profile Package TLVs. When receiving the Split Number TLV and the Split Total Number TLV, the eUICC can recognize the same as the divided Profile Package TLVs and process the same in the method of FIG. 4.

As an example, the eUICC can decode the encrypted and divided Profile Package TLV, identify the Split Number TLV within the divided Profile Package TLV, store the identified Split Number TLV in the eUICC buffer 2, store the plurality of divided Profile Package TLVs in the eUICC buffer 2, and then merge them into the Profile Package TLV before the dividing. The merging can include the following schemes:

Data contents can be simply and continuously attached to each other;
Data contents can be simply and continuously attached to each other in an order of the Split Number TLV.

As an example, the eUICC should receive the m entire divided Profile Package TLVs (i.e., when the Split Total Number is m). At this time, when some of the divided Profile Package TLVs are not received, the eUICC can request retransmission of the corresponding TLV data to the PM.

TABLE 1-2

| Name | M/O/C | Tag | Length | Value |
|---|---|---|---|---|
| Split Number | O | TBD | TBD | |
| Split Total Number | O | TBD | TBD | |
| ... | | | | |

Figure 5:
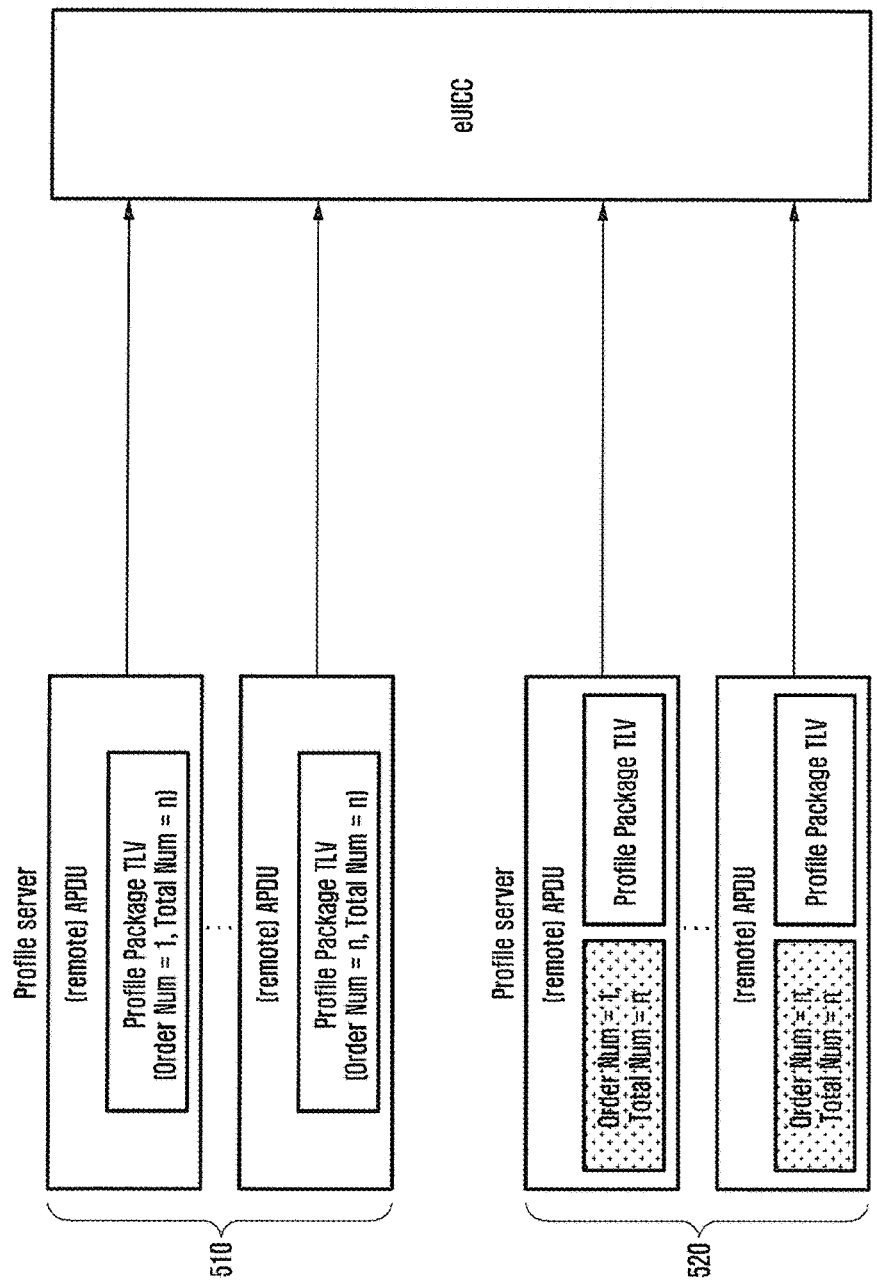
FIG. 5 illustrates a method of transmitting divided profile packages according to an embodiment of the present disclosure.

FIG. 5 illustrates a method of transmitting divided profile packages according to an embodiment of the present disclosure. rst, referring to 510 in FIG. 5, as represented in Table 1-2, the division number (Split Total Number TLV) of the entire Profile Package TLV and the Split Order numbers indicating ordinal sequences of the divided Profile Package TLVs are included in the Profile Package TLV, and can be transmitted to the eUICC using the APDU message. It is possible that the division number and the Split order numbers are slightly changed and transmitted in a form of not the APDU message but another message. For example, TLV data can be transmitted using an HTTPS protocol using BIP communication.

Referring to 520 in FIG. 5, the division number (Split Total Number TLV) of the entire Profile Package TLVs and the Split Order Numbers indicating ordinal sequences of the Profile Package TLVs are not included in the Profile Package TLV, and the corresponding information can be transmitted together with the divided Profile Package TLVs while being included in a message for transmitting the Profile Package TLV. As an example, when the APDU command is used, the information can be transmitted while the Split Order Number and the Split Total Number are included in a P1 byte and a P2 byte, respectively. As another example, it is possible that the division number and the Split order numbers are transmitted in a form of not the APDU message but another message. For example, when the TLV data is transmitted using the HTTPS protocol using the BIP communication while being included in the HTTP message, the division information can be transmitted together with the TLV.

When the profile is completely installed, the eUICC can store one or more profiles. At this time, when a specific profile is activated, a mobile communication function can be used by a mobile communication UE having the eUICC mounted thereto, using the corresponding profile.

Figure 6:
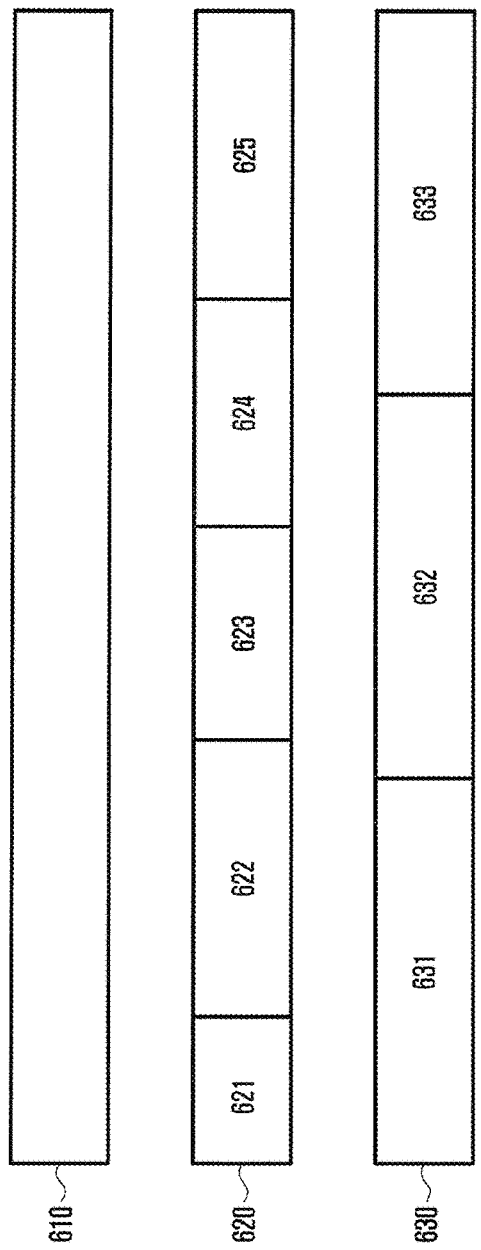
FIG. 6 illustrates a process of generating and encrypting a profile package according to an embodiment of the present disclosure.

FIG. 6 illustrates a process of generating and encrypting a profile package according to an embodiment of the present disclosure.

Referring to FIG. 6, reference numeral 610 corresponds to a profile package. Reference numeral 620 corresponds to a set of profile package information divided in an installable unit. In FIG. 6, the profile package 610 can be divided into 5 pieces of profile package information in an installable unit. A profile server can divide the profile package 610 into profile package information in an installable unit. Profile package information 621, 622, 623, 624, and 625 in an installable unit can be installed in the eUICC independently of other divided profile package information, respectively. For example, when the eUICC receives the entirety of the profile package information 621 and a part of the profile package information 622, the eUICC can install the profile package information 621 in an installable unit regardless of unreceived remaining information of the profile package information 622.

In FIG. 6, reference numeral 630 is a set of profile package information 631, 632 and 633 configured in an encryptable unit. The profile package information in an encryptable unit can be configured by a combination of profile package information divided in an installable unit. For example, the profile package information 631 in an encryptable unit can include the entirety of the profile package information 621 and a part of the profile package information 622 from among the profile package information in an installable unit. The profile package information 632 in an encryptable unit can include remaining information not included in the profile package information 631 from among the profile package information 622 from among the profile package information in an installable unit and can include the entirety of the profile package information 623 and a part of the profile package information 624. The profile package information 633 in an encryptable unit can include remaining information not included in the profile package information 632 from among the profile package information 624 from among the profile package information in an installable unit and can include the entirety of the profile package information 625.

The profile server can encrypt and transmit the profile package information 631, 632, and 633 in an encryptable unit. The profile server can encrypt each profile package information in an encryptable unit and transmit the encrypted profile package information to the electronic device including the eUICC.

The electronic device can receive the profile package information 631, 632 and 633 transmitted in an encryptable unit. The electronic device can divide, in a transmittable unit, the received profile package information 631, 632, and 633 in an encryptable unit, and transmit the divided profile package information to the eUICC. The eUICC can combine the profile package information divided in a transmittable unit to information in an encryptable unit. That is, the eUICC can combine the profile package information divided in a transmittable unit to the profile package information 631, 632, and 633, respectively. When the profile package information 631, 632 and 633 has been encrypted, the eUICC can decode the profile package information 631, 632 and 633. The eUICC can identify/combine the decoded information as/to the profile package information in an installable unit. When there is the profile package information 621, 622, 623, 624, and 625 in an installable unit, the eUICC can start to preferentially install the acquired profile package information in an installable unit. The eUICC can decode the entirety of the profile package information 621 in an installable unit and a part of the profile package information 622 in an installable unit.

For example, when the profile package information 631 in an encryptable unit is decoded, the eUICC can install information corresponding to the profile package information 621 from among the profile package information in an installable unit. Since the entirety of the profile package information 622 is not acquired and only a part of the profile package information in an installable unit is acquired, the eUICC can store, in the buffer, information corresponding to the profile package information 622 from among the decoded information. Next, the eUICC can decode the profile package information 632. When the profile package information 632 is decoded, information not included in the profile package information 631 from among the profile package information 622, the entirety of the profile package information 623, and a part of the profile package information 624 can be decoded. The eUICC can acquire the entirety of the profile package information 622 and the entirety of the profile package information 623 by combining a part of the profile package information 622 stored in the buffer and a part of the profile package information 622 acquired through the decoding. Since the entirety of the profile package information 622 and the entirety of the profile package information 623 are acquired, the eUICC can install the profile package information 622 and 623. Since the entirety of the profile package information 624 is not acquired, a part of the profile package information 624 acquired through decoding profile package information 634 can be stored in the buffer. In this way, the eUICC can receive information divided and transmitted in a transmittable unit, combine and decode the received information to information in an encryptable unit, and identify/combine the decoded information as/to information in an installable unit, thereby installing a profile package.

Figure 7:
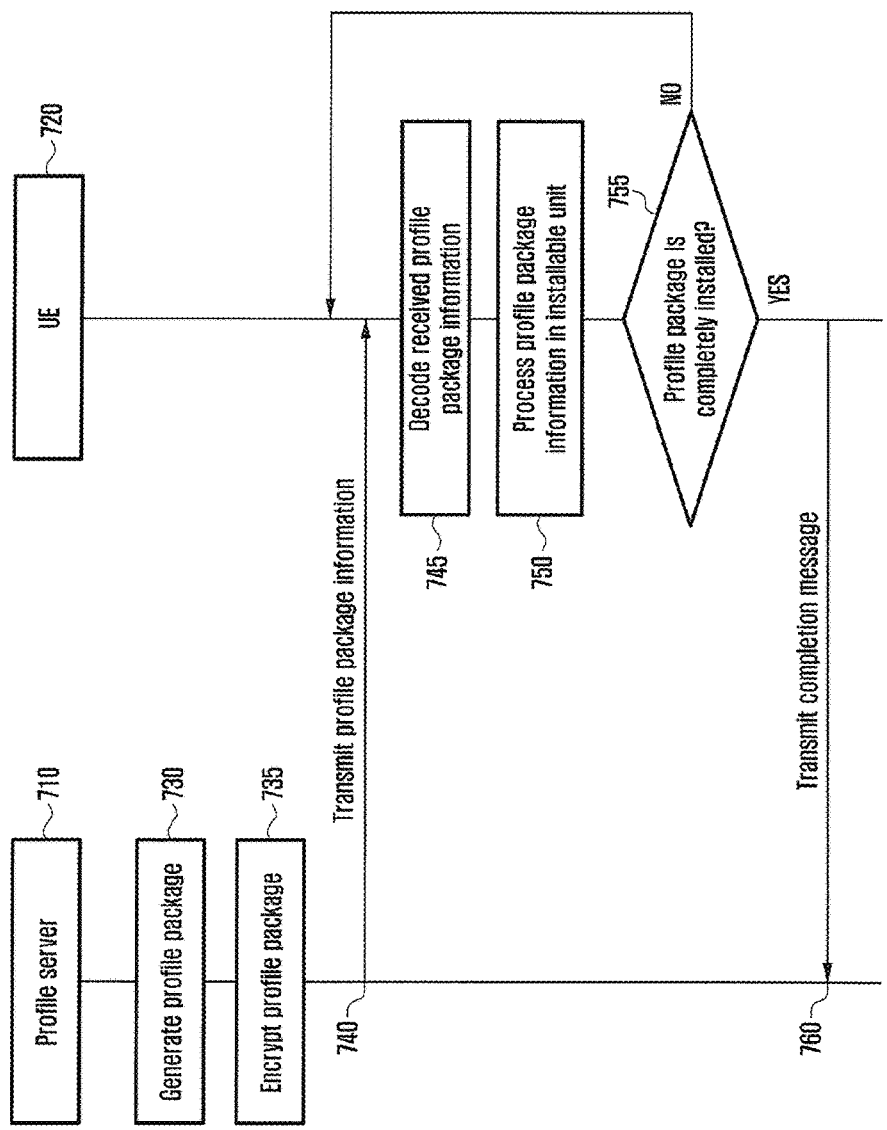
FIG. 7 is a flowchart illustrating a method of transmitting and installing a profile package according to an embodiment of the present disclosure.

FIG. 7 illustrates a method of transmitting and installing a profile package according to an embodiment of the present disclosure. In FIG. 7, a UE is an embodiment of an electronic device including an eUICC or a UICC. In FIG. 7, the UE corresponds to a UE including an eUICC or a UICC. The following operation can be performed by the UICC or the eUICC of the UE.

In operation 730, a profile server 710 can generate a profile package. The profile package can be a profile package having a TLV form. A structure of the profile package in an embodiment of FIG. 7 will be described with reference to FIG. 6. The profile server 710 can generate profile package information 621, 622, 623, 624 and 625 in an installable unit. The profile server 710 can divide the generated profile package information in an installable unit, and can divisionally generate the profile package information in an installable unit when generating the profile package information.

In operation 735, the profile server can reconfigure the profile package information in an installable unit as profile package information in an encryptable unit. The profile package information 631, 632, and 633 in an encryptable unit can be configured by a combination of profile package information divided in an installable unit. The profile server 710 can encrypt and transmit the profile package information 631, 632, and 633 in a transmittable unit. The profile server can encrypt each of the profile package information 631, 632, and 633 in an encryptable unit.

In operation 740, the profile server 710 can transmit the profile package information to a UE 720. The profile server 710 can configure and transmit the encrypted profile package information 631, 632 and 633 to an eUICC of the UE 720 in a transmittable unit, in the UE 720. When the entirety of the profile package information is configured by m pieces of transmittable profile package information, operation 740 can be performed until the entirety of m pieces of profile package information in an encryptable unit is transmitted.

The UE 720 can receive profile package information. The profile package information can be encrypted. The UE 720 can transmit the received profile package information to the eUICC of the UE 720. The UE can divide, in a transmittable unit, the encrypted profile package information 631, 632, and 633, and transmit the divided profile package information to the eUICC.

The eUICC can combine the profile package information divided in a transmittable unit and configure profile package information in an encryptable unit.

In operation 745, the eUICC of the UE can decode the encrypted profile package information 631, 632, and 633. In order to install a profile in the eUICC, the profile server and the UE 720 or the eUICC can perform a mutual authentication process for key agreement. The profile package information can include a parameter necessary for generating an encryption key used to decode the profile package information encrypted by the eUICC. The eUICC can extract a parameter necessary for generating an encryption key from the profile package information, generate the encryption key on the basis of the extracted parameter, and then perform a decoding operation using the generated encryption key.

When the received profile package information 631 is decoded, the entirety of the profile package information 621 in an installable unit and a part of the profile package information in an installable unit can be decoded. In operation 750, the UE 720 can process the profile package information in an installable unit using the decoded information. When acquiring the profile package information in an installable unit, the UE can install the acquired profile package information in an installable unit. For example, when the profile package information 631 in an encryptable unit is received and decoded, the eUICC can install information corresponding to the profile package information 621 from among the profile package information in an installable unit. The eUICC can store information corresponding to the profile package information from among the decoded information in the buffer.

In operation 755, the UE 720 can determine whether the profile package information is completely installed. When the installation is not completely performed, the process can proceed to operations 740, 745 and 750. The process can proceed to operation 740 when the profile package information is not completely received, proceed to operation 745 when the profile package information is not completely decoded, and proceed to operation 750 when the profile package information is completely received and decoded but is not completely installed. Meanwhile, when there is an error in the received profile package information, the UE can request the profile server 710 to retransmit the corresponding information. In an embodiment of the present disclosure, since the profile server 710 divisionally transmits the profile package information in a transmittable unit, the profile server 710 can retransmit only profile package information in which an error has occurred and not the entirety of the profile package information when there is an error in specific information.

When the profile package information is completely installed, the UE 720 can terminate an installation related operation. In operation 760, the UE can transmit, to the profile server 710, a profile package installation completion message.

Figure 8:
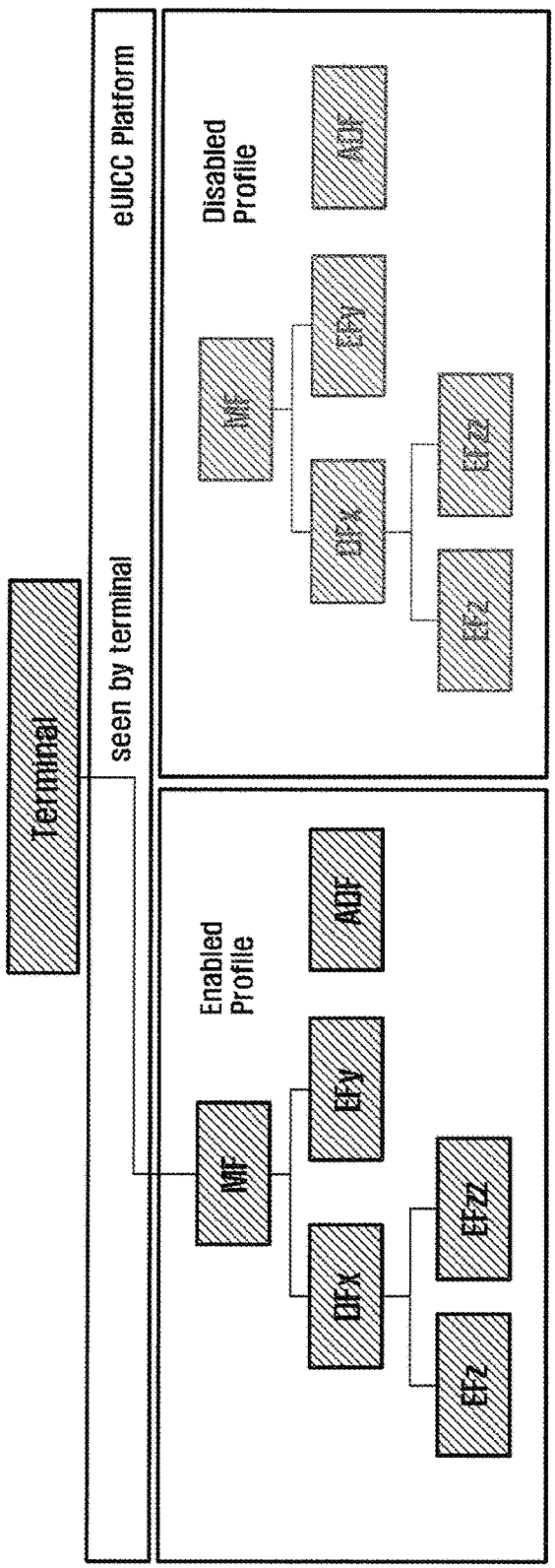
FIG. 8 illustrates a method of activating a profile after selecting the profile and a file structure of the profile.

FIG. 8 illustrates a method of activating a profile after selecting the profile, and a file structure of the profile.

Referring to FIG. 8, an individual profile can be installed in an eUICC platform. At this time, the file structure of the individual profile can include one MF file. The eUICC platform can make a selection to show one profile from among a plurality of profiles by a UE. The eUICC platform, a UE, or an SM-SR can select one of the profiles. When a profile is selected by the UE, the eUICC can immediately perform a command received from the UE. Otherwise, when a profile is selected by the UE, the eUICC can verify a signature value and perform a command received from the UE without immediately performing the command. Such a signature value can be processed the following scheme:

In case of signature value using symmetric key, verify signature value using symmetric key;

In case of signature value using private key of RSA authentication certificate, verify signature value using RSA public key;

In case of ECDSA signature value using private key of ECC authentication certificate, verify ECDSA signature using public key of ECC authentication certificate.

Meanwhile, a format of the profile stored in the PP can have the following structure. The corresponding format can be converted into a form of the Profile Package TLV or a Remote APDU in order to download the profile to the eUICC.

Table 5 describes contents of a profile package. The profile package can include the entirety or a part of the contents of Table 5.

TABLE 5

| Item | Function | Status | Value Type |
|---|---|---|---|
| CardProfile | | | |
|   Header | | M | |
|     Template Information | This section describes all the attributes that will capture details about the skeleton | M | |
|     Template Version | Reference according to which skeleton version this file has been produce. Value: 1.0 | M | Variable String |
|     . . . | | | |
|     SIMCardProfileReference | Profile reference information | M | |
|       MobileCountryCode | MobileCountryCode | M | 3 INT |
|       MobileNetworkCode | MobileNetworkCode | M | 3 INT |
|     . . . | | | |
|   . . . | | | |
|   CardBody | | | |
|     MF_DF | | R | |
|       File Name | Name of the MF or DF | M | Variable String |
|       File Type | ENUM value: '00' for MF, '11' for DF | M | ENUM |
|     . . . | | | |
|     ADF | | O/R | |
|       File Name | Name of the ADF. | M | Variable String |
|       File Type | ENUM value: '00' for USIM | M | ENUM |
|     . . . | | | |
|     EF | | O/R | |
|       File Name | Name of the EF | M | Variable String |
|     . . . | | | |
|   Card_Management | | M | |
|     Authentication | Defines the requirements needed for authentication | M | |

TABLE 5-continued

| Item | Function | Status | Value Type |
|---|---|---|---|
| Authentication3G | | O/R | |
|   Authentication3GAlgorithm | Authentication Algorithm: ENUM value: '00' for MILENAGE, '01' for TUAK | O/R | ENUM |
|   Authentication3GSeqNb | Sequence number linked to the Authentication activated or not according to TS 33.102 | O | Boolean (Y or N) |
|     Authentication3GFreshnessTest | Defines if the freshness test is activated or not according to TS 33.102 | O | Boolean (Y or N) |
|     Authentication3GAgeLimitTest | Defines if age limit test is set or not according to TS 33.102 | O | Boolean (Y or N) |
|     Authentication3GWrapAround Protection | Defines if protection against wrap around is set or not according to TS 33.102 | O | Boolean (Y or N) |
|   Authentication3GDeltaValue | Value of Delta for wrap around according to TS 33.102 | C | Variable Hex |
|   Authentication3G_L_Value | Value of L for age limit according to TS 33.102 | C | Variable Hex |
|   Authentication3G_SQN_Index | Length of SQN Array according to 33.102 (default:32) | C | Variable Hex |
|   Authentication3GRESLength | Value of the RES length for TUAK ENUM value: '00' for 64, '01' for 128 bits | C | ENUM |
|   Authentication3G_Ri_Ci_ValueType | MNO Specific configurations for MILENAGE ENUM value: '00' for default Ri and Ci values according to TS 35.206, '01' for MNO Specific Ri and Ci values | C | ENUM |
|     Authentication3G_R1 | MNO Specific r1 value | O | INT |
|     Authentication3G_R2 | MNO Specific r2 value | O | INT |
|     Authentication3G_R3 | MNO Specific r3 value | O | INT |
|     Authentication3G_R4 | MNO Specific r4 value | O | INT |
|     Authentication3G_R5 | MNO Specific r5 value | O | INT |
|     Authentication3G_Ci | MNO Specific ci values Values: concatenation with c1, c2, c3, c4 and c5 in Hex format | O | 80 Hex |
|     Authentication3G_TUAK_Iteration | Number of iterations of Keccak permutation according to TS 35.231 | O | INT |
|   Authentication3G_K | 128 bit for MILENAGE or TUAK | M | 16 Hex |
|   Authentication3G_OP | MILENAGE OP, according to 3GPP TS 35.206 | C | 16 Hex |
|   Authentication3G_OPc | MILENAGE OPc, according to 3GPP TS 35.206 | C | 16 Hex |
|   Authentication3G_TOP | TUAK TOP, according to 3GPP TS 35.231 | C | 32 Hex |
|   Authentication3G_TOPc | TUAK TOPc, according to 3GPP TS 35.231 | C | 32 Hex |
|   . . . | | | |
|   . . . | | | |
| . . . | | | |
| Applications | To capture details about the applications installed on the card, AID structure, applet status. | M | |
|   RFM application | | O/R | |
|     TAR | Toolkit application reference | M | 3 Hex |
|     . . . | | | |
|   RAM application | | O/R | |
|     TAR | Toolkit application reference | M | 3 Hex |
|     . . . | | | |
|   Applets | | | |
|     . . . | | | |

Note:
Parameters should be further categorized and added into this table to fully describe a profile.

Note:
Values for Status (M: Mandatory, O: Optional, C: Conditional, R: Repeatable).

The profile can include the type of a separate NAA algorithm, a parameter of the NAA algorithm, and an NAA Key value (e.g., K for USIM and K for SIM) according to each AMF value. In this case, the eUICC can execute an NAA application program to correspond to the type of a separate NAA algorithm, a parameter of the NAA algorithm, and an NAA Key value (e.g., K for USIM and K for SIM) according to each AMF value.

Figure 9:
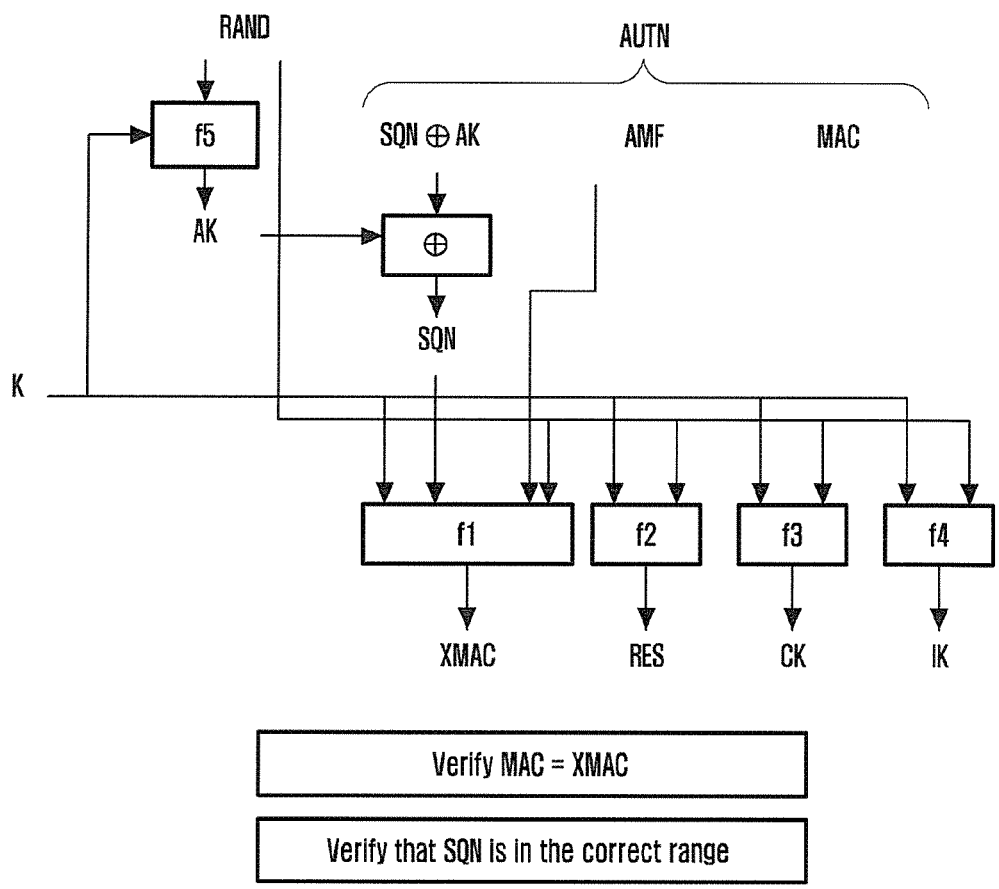
FIG. 9 illustrates an AKA authentication process for performing authentication of a USIM within an eSIM profile.

FIG. 9 illustrates an AKA authentication process for performing authentication of USIM within an eSIM profile.

The AKA authentication process can be performed when an NAA installed in the profile corresponds to a USIM.

The NAA can be transmitted while being included in the profile or can previously exist in the eUICC platform.

When the NAA is included in the profile, the corresponding NAA does not implement an f1 funtion, an f2 funtion, an f3 funtion, and an f4 funtion of FIG. 9, and can be implemented to call a function implemented in the eUICC platform. Further, when calling the f1 funtion, the f2 funtion, the f3 funtion, and f4 funtion, the eUICC can select and use a parameter corresponding to the AMF field transmitted from the UE. For example, the eUICC can select and use an authentication encryption key (K) value according to the AMF value. As another example, the eUICC can use different authentication algorithm configuration values (e.g., r1-r5, c1-c5, etc. of an MILENAGE algorithm) according to the AMF value.

In FIG. 9, a logic for verifying whether the SQN is included in a correct range can be downloaded while being included in profile information. The corresponding logic can be included in the NAA application program excluding the f1 funtion, the f2 funtion, the f3 funtion, and the f4 funtion.

FIGS. 10 to 13 illustrate an operation of transmitting profile information according to an additional embodiment of the present disclosure.

Figure 10:
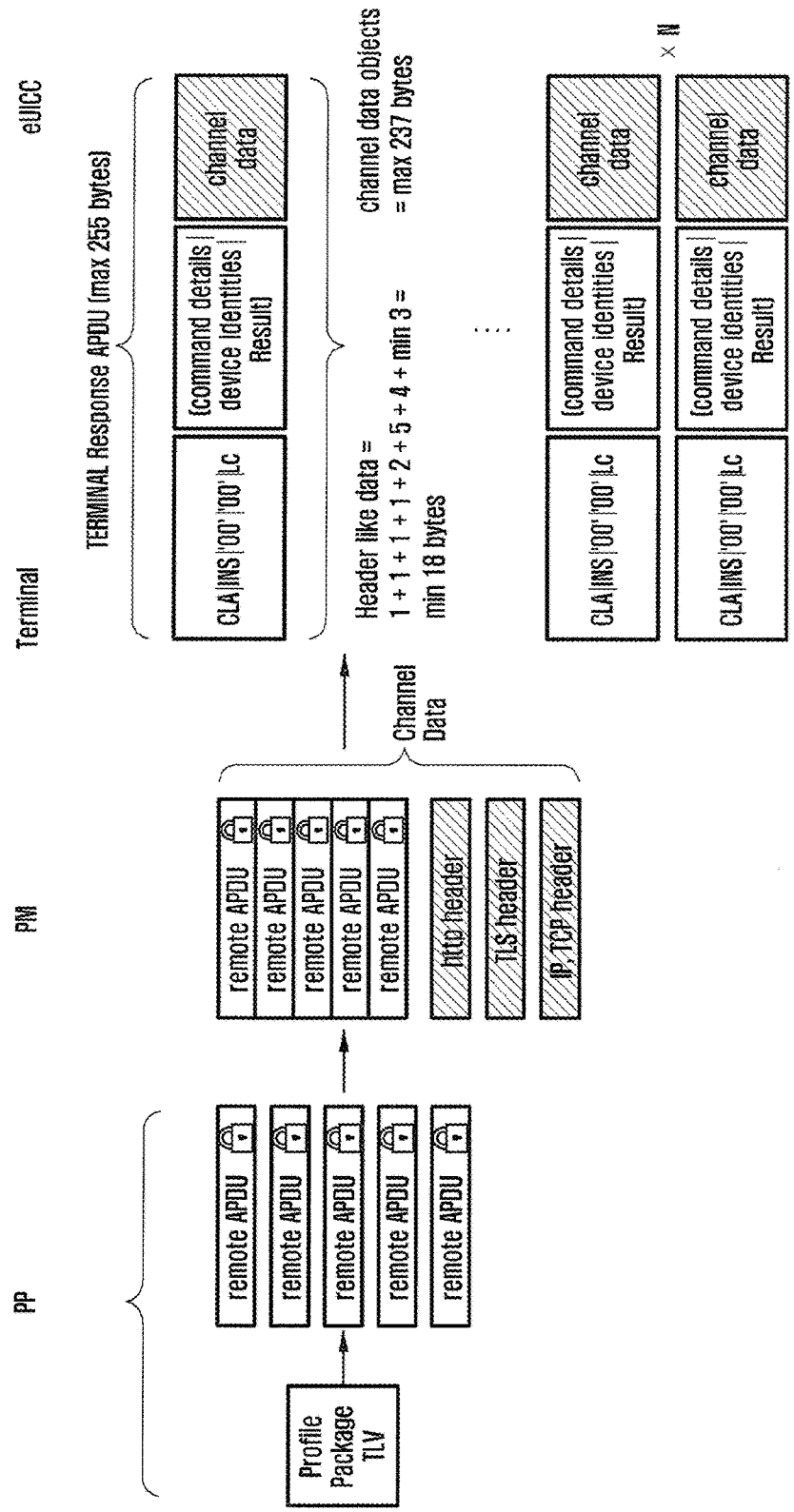
FIGS. 10 to 13 illustrate an operation of transmitting profile information according to an additional embodiment of the present disclosure.

Referring to FIG. 10, first, the profile server can configure information constituting the Profile in a Profile Package TLV form. The profile server can configure profile package information by dividing the profile package information in an installable unit.

The Profile Package TLV includes information by which the profile can be installed in the eUICC after being transmitted to the eUICC of the UE.

The profile server can include the Profile Package TLV in a message having an APDU form. In general, data which can be included in the APDU has maximally the size of 255 bytes, and the Profile Package TLV has the size of several tens of kBytes to several hundreds of Kbytes. Thus, when the Profile Package TLV is included in the APDU, the Profile Package TLV is included in the individual APDU in a state in which the Profile Package TLV is divided. The APDU can be a transmittable unit for the profile package.

The divided APDU can be encrypted in a transmission process or a previous step. The profile service can encrypt the profile package information in a transmittable unit, and then include the encrypted profile package information in the APDU. The profile server can transmit the encrypted APDU or the APDU including the encrypted profile package information from the PP to the PM. At this time, data can be additionally protected using a communication channel security scheme such as VPN and IPSEC. Further, the PP can perform a mutual authentication process with the eUICC before transmitting APDU data to the PM. Such a mutual authentication process will be as follow:

Perform authentication on basis of ECC authentication certificate;
Generate symmetric key through ECKA process on basis of ECC authentication certificate and then perform authentication on basis of generated symmetric key;
Perform mutual authentication on basis of RSA authentication certificate;
When performing mutual authentication on basis of RSA authentication certificate, generate symmetric key and then perform authentication on basis of generated symmetric key;
Encrypt generated symmetric key on basis of RSA authentication certificate, transmit encrypted symmetric key, and then perform mutual authentication on basis of mutual key, by PP.

The profile server can generate a TLS communication channel through TLS handshaking with the eUICC. Such TLS handshaking can be performed using the RSA authentication certificate or a previously-stored symmetric key.

The profile server can transmit the encrypted Profile Package TLV or the divided and encrypted Profile Package TLV to the UE using the TLS communication channel in a state in which the Profile Package TLV is included in the HTTP message. At this time, the implementation that the Profile Package TLV is transmitted while being included in the HTTP message merely corresponds to an example of implementation, and the Profile Package TLV can be transmitted while being included in another communication protocol.

For example, the Profile Package TLV can be transmitted to a MODEM unit of the UE. The MODEM unit of the UE can transmit a received IP packet to the eUICC in a state in which the IP packet is included in a TERMINAL RESPONSE APDU message. To this end, the profile server can generate a Bearer Independent Protocol channel with the eUICC using an SMS message in advance. The SMS message can include an encrypted PUSH ADPU command. The SMS message can be transmitted from the MODEM unit of the UE to the eUICC while being included in ENVELOPE APDU, and a PUSH APDU command can be processed after the encrypted PUSH APDU command within the SMS message included in the ENVELOPE message is decoded.

The eUICC can generate a BIP channel using an OPEN CHANNEL Proactive command after processing the PUSH APDU. The TERMINAL RESPONSE can be an APDU command by which an IP packet stored in a reception buffer of the MODEM unit of the UE can be transmitted to the eUICC. At this time, the TERMINAL RESPONSE can be a RECEIVE DATA Proactive command transmitted from the eUICC. In general, since the size of data in TERMINAL RESPONSE APDU is within 255 bytes, TERMINAL RESPONSE APDU can be transmitted several times in order to transmit data having a size larger than 255 bytes.

The eUICC can immediately process the data transmitted by receiving the TERMINAL RESPONSE, and process received data together after receiving a plurality of TERMINAL RESPONSEs. In detail, the HTTP message can be restored by aggregating data included in the plurality of TERMINAL RESPONSEs. When the HTTP is restored, the eUICC extracts encrypted APDU commands in the body text of the HTTP message using an AID value or a TAR value in a header area, and then transmits the encrypted APDU command to a Security Domain, a Profile Domain, or an Application corresponding to the AID value or the TAR value. Then, the Security Domain (or the Profile Domain or the Application) can decode and then process the encrypted APDU command.

When the encrypted APDU message is included in the HTTP message, if a user wants to express the encrypted APDU message in a STRING form, the user can use the following schemes:

Convert value, obtained by transforming APDU binary data in hexadecimal form, into character string: In this case, 1 byte of hexadecimal data is converted into two characters, the size of data included in a final http message can be increased two times;

APDU binary data is Base-64-encoded to be converted into character string: In this case, the size of data can be increased by about 33%.

As above, when the APDU command is converted in a STRING form and is transmitted, an amount of messages transmitted between the Terminal and the eUICC is increased two times, thereby greatly increasing a time period during which the profile is downloaded. Thus, it can be preferred that the APDU command is not converted into a character string and is transmitted in a binary data form.

The eUICC decodes the received APDU. When profile package information in an installable unit is included as a result of the decoding, the eUICC can install the profile package information in an installable unit. Remaining information excluding the information on the profile package in an installable unit can be stored in the buffer. The eUICC can additionally receive the APDU, and decode the APDU. The eUICC can install the profile package information in an installable unit using the decoded information of the received APDU in addition to the remaining data stored in the buffer.

Figure 11:
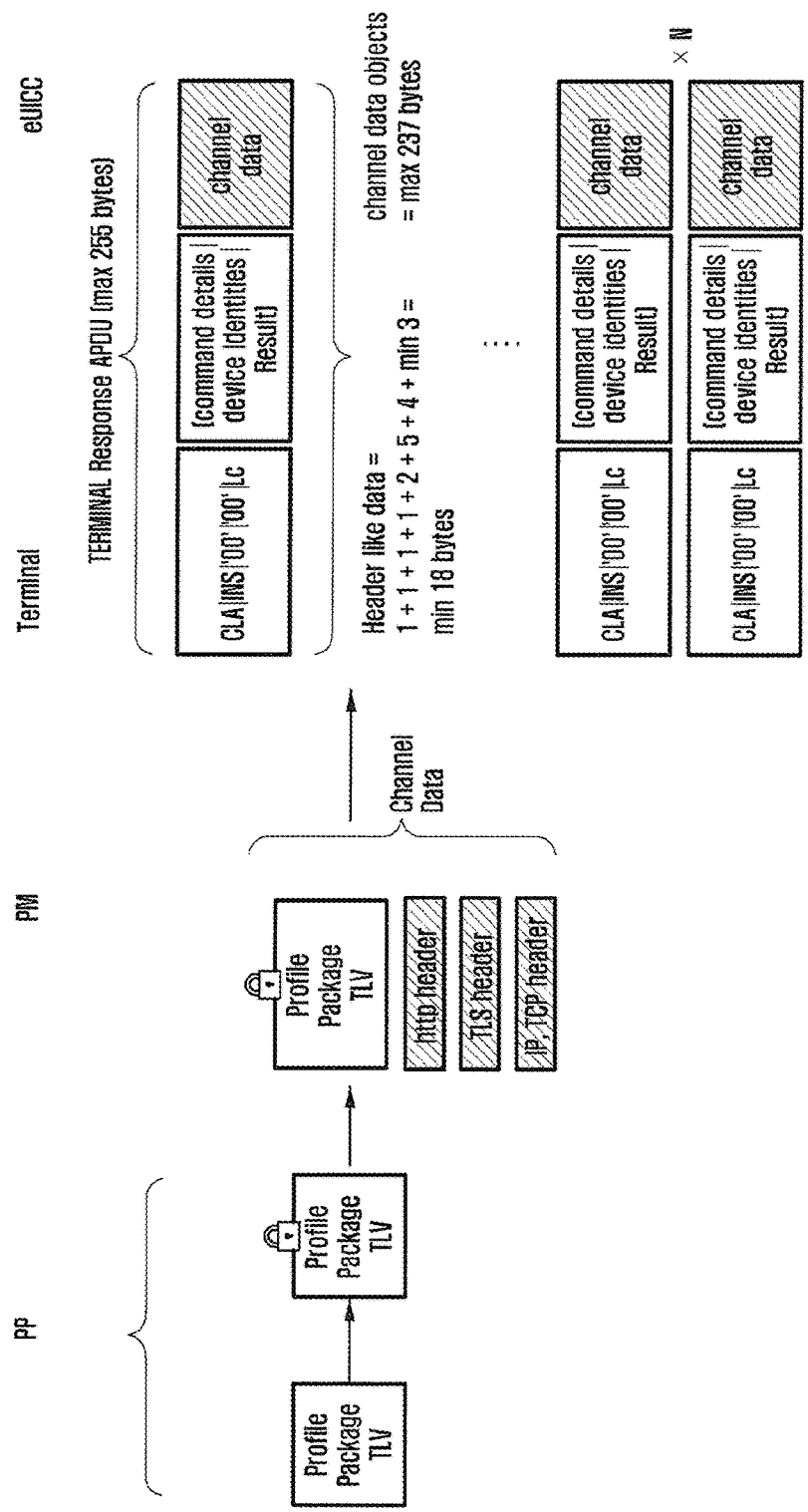

Referring to FIG. 11, first, the profile server can configure information constituting the Profile in a Profile Package TLV form.

The Profile Package TLV includes information by which the profile can be installed in the eUICC after being transmitted to the eUICC.

The profile server can encrypt the Profile Package TLV as it is. Otherwise, the PP can divide the Profile Package TLV into several parts and then encrypt the same. The profile server can divide a profile package TLV into profile package information in an installable unit and/or a transmittable unit, and encrypt the divided profile package information.

The PP can transmit the encrypted Profile Package TLV to the PM. At this time, data can be additionally protected using a communication channel security scheme such as VPN and IPSEC. Further, the PP can perform a mutual authentication process with the eUICC before transmitting the encrypted Profile Package TLV to the PM. Such a mutual authentication process will be as follow:

Perform authentication on basis of ECC authentication certificate;

Generate symmetric key through ECKA process on basis of ECC authentication certificate; and then perform authentication on basis of generated symmetric key;

Perform mutual authentication using RSA authentication certificate;

When performing mutual authentication on basis of RSA authentication certificate, generate symmetric key, and then perform authentication on basis of generated symmetric key;

Encrypt generated symmetric key using RSA authentication certificate, transmit encrypted symmetric key, and perform mutual authentication using transmitted symmetric key, by PP.

The PM can generate a TLS communication channel through TLS handshaking together with the eUICC. Such TLS handshaking can be performed using the RSA authentication certificate or a previously-stored symmetric key.

The profile server can include one APDU message or a plurality of APDU messages in the HTTP message, and transmit the HTTP message to the UE using the TLS communication channel. For example, the Profile Package TLV can be transmitted to a MODEM unit of the UE. The MODEM unit of the UE can transmit a received IP packet to the eUICC in a state in which the IP packet is included in a TERMINAL RESPONSE APDU message. To this end, the PM can generate a Bearer Independent Protocol channel with the eUICC using an SMS message in advance. The SMS message can include an encrypted PUSH ADPU command. The SMS message can be transmitted from the MODEM unit of the UE to the eUICC while being included in ENVELOPE APDU, and a PUSH APDU command can be processed after the encrypted PUSH APDU command within the SMS message included in the ENVELOPE message is decoded. The eUICC can generate a BIP channel using an OPEN CHANNEL Proactive command after processing the PUSH APDU. The TERMINAL RESPONSE can be an APDU command by which an IP packet stored in a reception buffer of the MODEM unit of the UE can be transmitted to the eUICC. At this time, the TERMINAL RESPONSE can be a RECEIVE DATA Proactive command transmitted from the eUICC. In general, since the size of data in TERMINAL RESPONSE APDU is within 255 bytes, TERMINAL RESPONSE APDU can be transmitted several times in order to transmit data having a size larger than 255 bytes.

The eUICC can immediately process the data transmitted by receiving the TERMINAL RESPONSE, and process received data together after receiving a plurality of TERMINAL RESPONSEs. In detail, the HTTP message can be restored by aggregating data included in the plurality of TERMINAL RESPONSEs. When the HTTP is restored, the eUICC can extract encrypted Profile Package TLV in the body text of the HTTP message using an AID value or a TAR value in a header area, and then transmit the encrypted Profile Package TLV command to a Security Domain, a Profile Domain, or an Application corresponding to the AID value or the TAR value. Then, the Security Domain (or Profile Domain or Application) can decode the encrypted Profile Package TLV, and then install the profile using the decoded Profile Package TL.

When the Profile Package TLV is included in the HTTP message, if a user wants to express the Profile Package TLV in a STRING form, the user can use the following schemes:

Convert value, obtained by transforming APDU binary data in hexadecimal form, into character string: In this case, 1 byte of hexadecimal data is converted into two characters, and thus, size of data finally included in http message can be increased two times;

APDU binary data is Base64-encoded to be converted into character string: In this case, size of data can be increased by 33%.

As above, when the Profile Package TLV is converted in a STRING form and is transmitted, an amount of messages transmitted between the UE and the eUICC is increased two times, thereby greatly increasing a time period during which the profile is downloaded. Thus, it can be preferred that the Profile Package TLV is not converted into a character string and is transmitted in a binary data form.

Figure 12:
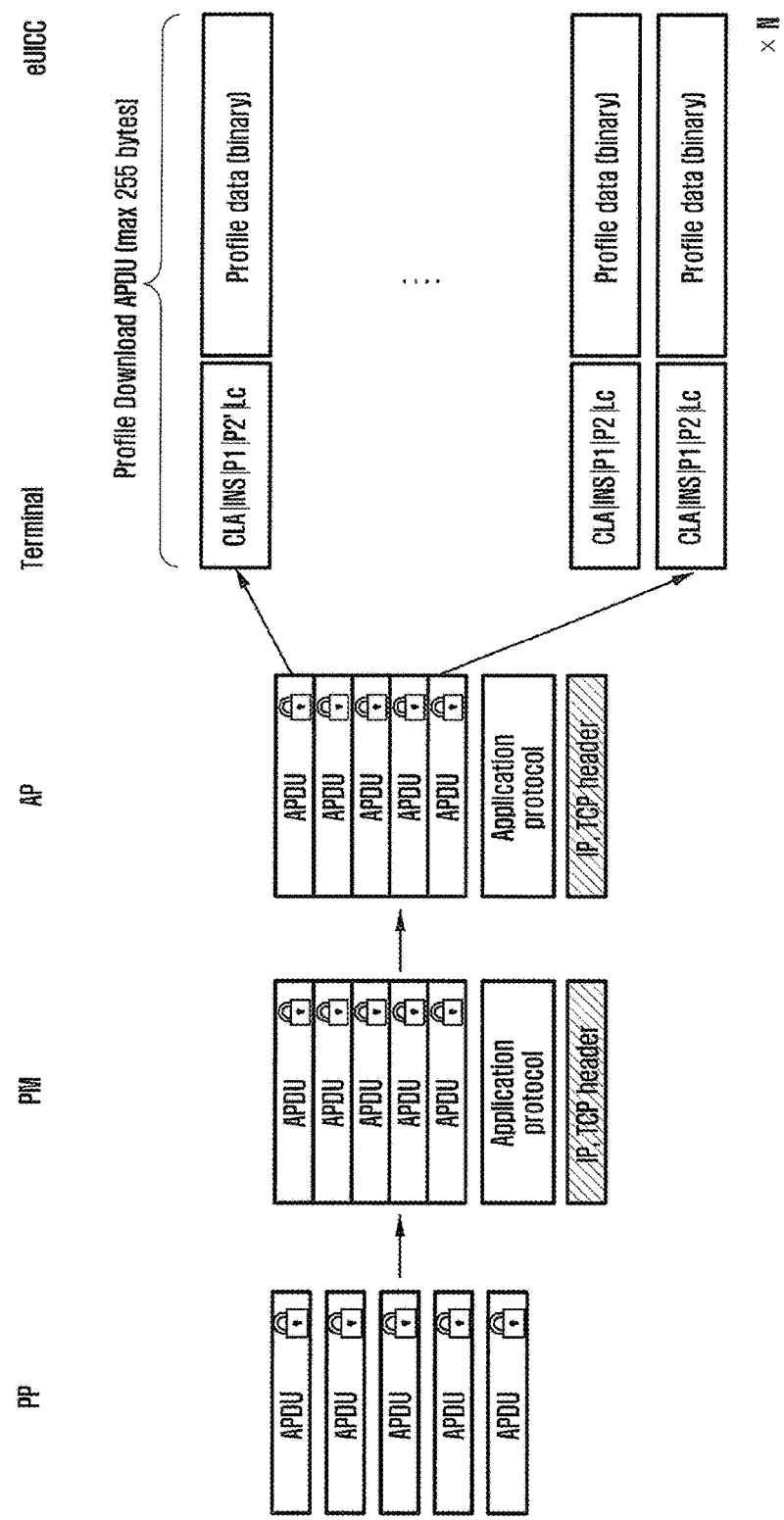

Referring to FIG. 12, first, the profile server can configure information constituting the Profile in an APDU form. The APDU can be a transmittable unit of a profile package and can include the profile package information in an installable unit.

The PP can encrypt the APDU in a transmission process or a previous step. The profile service can encrypt the profile package information in a transmittable unit, and then include the encrypted profile package information in the APDU. The profile server can transmit the encrypted APDU or the APDU including the encrypted profile package information from the PP to the PM. At this time, data can be additionally protected using a communication channel security scheme such as VPN and IPSEC. Further, the PP can perform a mutual authentication process with the eUICC before transmitting APDU data to the PM. Such a mutual authentication process will be as follow:

Perform authentication on basis of ECC authentication certificate;
Generate symmetric key through ECKA process on basis of ECC authentication certificate, and then perform authentication on basis of generated symmetric key;
Perform mutual authentication using RSA authentication certificate;
When performing mutual authentication on basis of RSA authentication certificate, generate symmetric key, and then perform authentication on basis of generated symmetric key;
Encrypt generated symmetric key using RSA authentication certificate, transmit encrypted symmetric key, and then perform mutual authentication using transmitted symmetric key, by PP.

The profile server can generate a TLS communication channel through TLS handshaking together with the eUICC. Such TLS handshaking can be performed using the RSA authentication certificate or a previously-stored symmetric key.

The PM can transmit encrypted APDUs to an AP of the UE. When the PM directly communicates with the eUICC, a probability that the communication succeeds can be lowered, and thus, data is stably downloaded to the AP of the UE through high speed communication such as 3G communication or LTE communication, and the APDU message is then transmitted from the AP of the UE to the eUICC via a MODEM or directly.

In this case, since an ETSI TS 102.226 Remote Application Management (RAM) application or a Remote File Management (RFM) application cannot process the message to be transmitted to the UE, a dedicated profile installation application for processing the message received from the UE and installing a file system and an application is separately needed in the eUICC. For convenience, the APDU for installing the profile can be a Profile Download message. A header of the Profile Download message can include a CLA byte, an INS byte, a P1 byte, and a P2 byte.

Further, the UE can transmit a Profile Download APDU or another APDU message to the eUICC before transmitting the APDU including the profile information, and transmit the APDU to the eUICC in a state in which the APDU includes information on which Security Domain or Profile Domain or Application the APDU including the profile information is processed by. Further, the APDU message can transmit the profile using a logical channel of a value different from 0 using the CLA byte even when another application program exists in the eUICC.

Meanwhile, the UE can transmit the profile information to the eUICC using the Profile Download APDU, and then additionally transmit a separate APDU command to the eUICC, thereby installing the profile.

In the above method, since the APDU is not transmitted while being included in the HTTP message, it is unnecessary to convert the APDU command into a character string, and since the APDU message having a binary form is directly transmitted, an efficiency thereof is increased by 33%-100%.

Figure 13:
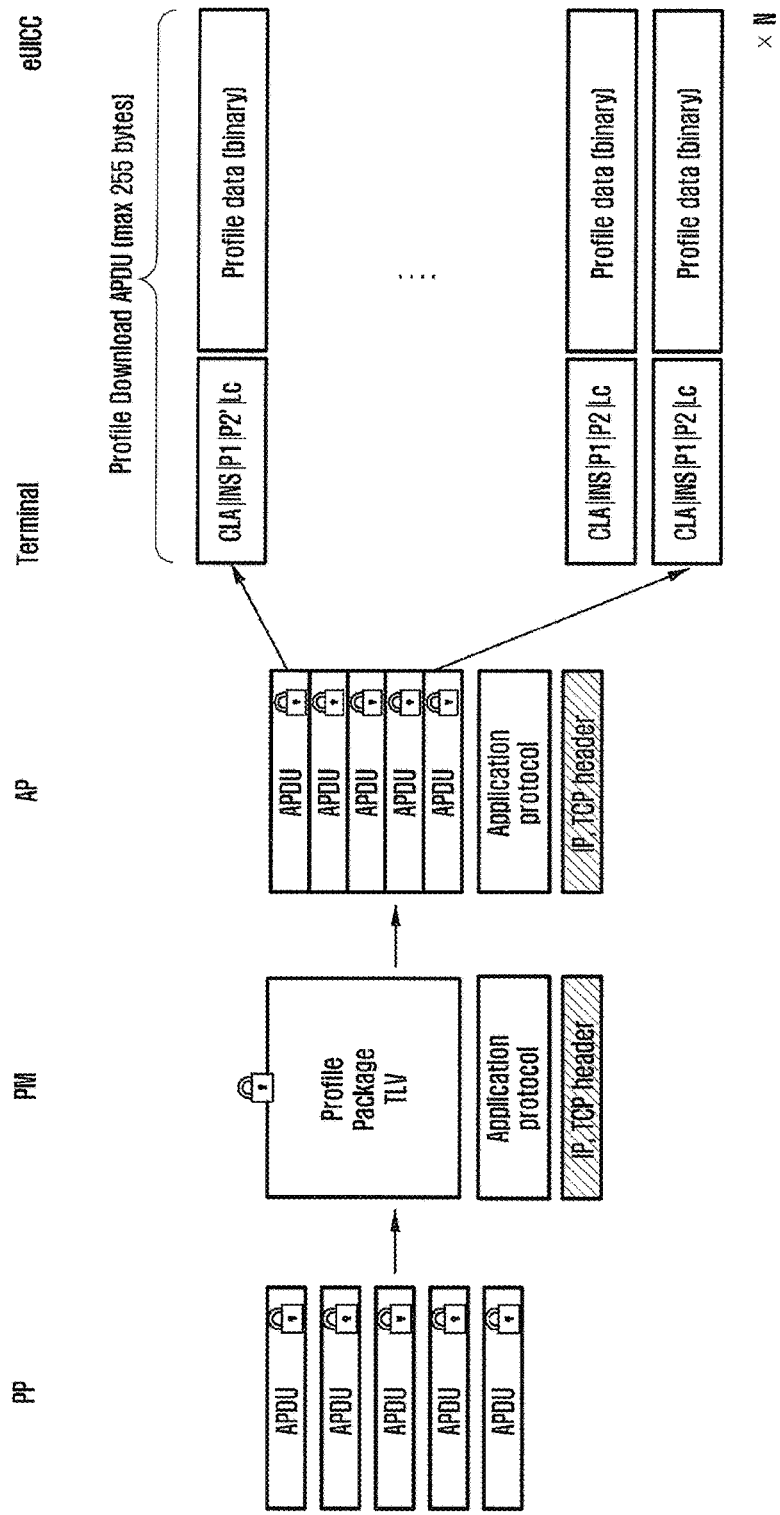

Referring to FIG. 13, first, the profile server can generate and then encrypt a Profile Package TLV including information constituting the Profile. Further, the Profile Package TLV can be encrypted in a state in which the Profile Package TLV is divided in a specific size. The profile server can divide and generate the generated profile package information into a plurality of pieces of profile package information in an installable unit. Further, the profile server can encrypt the profile package information in an encryptable unit, which includes the profile package information in an installable unit.

Further, the profile server can encrypt the Profile Package TLV in a transmission process or a previous step.

The profile server can transmit the encrypted Profile Package TLV from the PP to the PM. At this time, data can be additionally protected using a communication channel security scheme such as VPN and IPSEC. Further, the PP can perform a mutual authentication process with the eUICC before transmitting the Profile Package TLV to the PM. Such a mutual authentication process will be as follow:

Perform authentication on basis of ECC authentication certificate;
Generate symmetric key through ECKA process on basis of ECC authentication certificate, and then perform authentication on basis of generated symmetric key;
Perform mutual authentication using RSA authentication certificate;
When performing mutual authentication on basis of RSA authentication certificate, generate symmetric key, and then perform authentication on basis of generated symmetric key;
Encrypt generated symmetric key using RSA authentication certificate, transmit encrypted symmetric key, and then perform mutual authentication using transmitted symmetric key, by PP.

The profile server can transmit the encrypted Profile Package TLV to an AP of the UE. At this time, the profile server can transmit the Profile Package TLV in a state in which the Profile Package TLV is divided into APDUs, or can transmit the Profile Package TLV using an application protocol. An example of the Application Protocol can correspond to an HTTP protocol. When the profile server directly communicates with the eUICC, a probability that the communication succeeds can be lowered, and thus, data is stably downloaded to the AP of the UE through high speed communication such as 3G communication or LTE communication, and the APDU message is then transmitted from the AP of the UE to the eUICC via a MODEM or directly.

In this case, since an ETSI TS 102.226 Remote Application Management (RAM) application or a Remote File Management (RFM) application cannot process the message to be transmitted to the UE, a dedicated profile installation application for processing the message received from the UE and installing a file system and an application is separately needed in the eUICC. For convenience, the APDU for installing the profile can be a Profile Download message. A header of the Profile Download message can include a CLA byte, an INS byte, a P1 byte, and a P2 byte.

Further, the UE can transmit a Profile Download APDU or another APDU message to the eUICC before transmitting the APDU including the profile information, and transmit the APDU to the eUICC in a state in which the APDU includes information on which Security Domain or Profile Domain or Application the APDU including the profile information is processed by. Further, the APDU message can transmit the profile using a logical channel of a value different from 0 using the CLA byte even when another application program exists in the eUICC.

Meanwhile, the UE can transmit the profile information to the eUICC using the Profile Download APDU, and then additionally transmit a separate APDU command to the eUICC, thereby installing the profile.

In the above method, since the APDU is not transmitted while being included in the HTTP message, it is unnecessary to convert the APDU command into a character string, and since the APDU message having a binary form is directly transmitted, an efficiency thereof is increased by 33%-100%.

Figure 14:
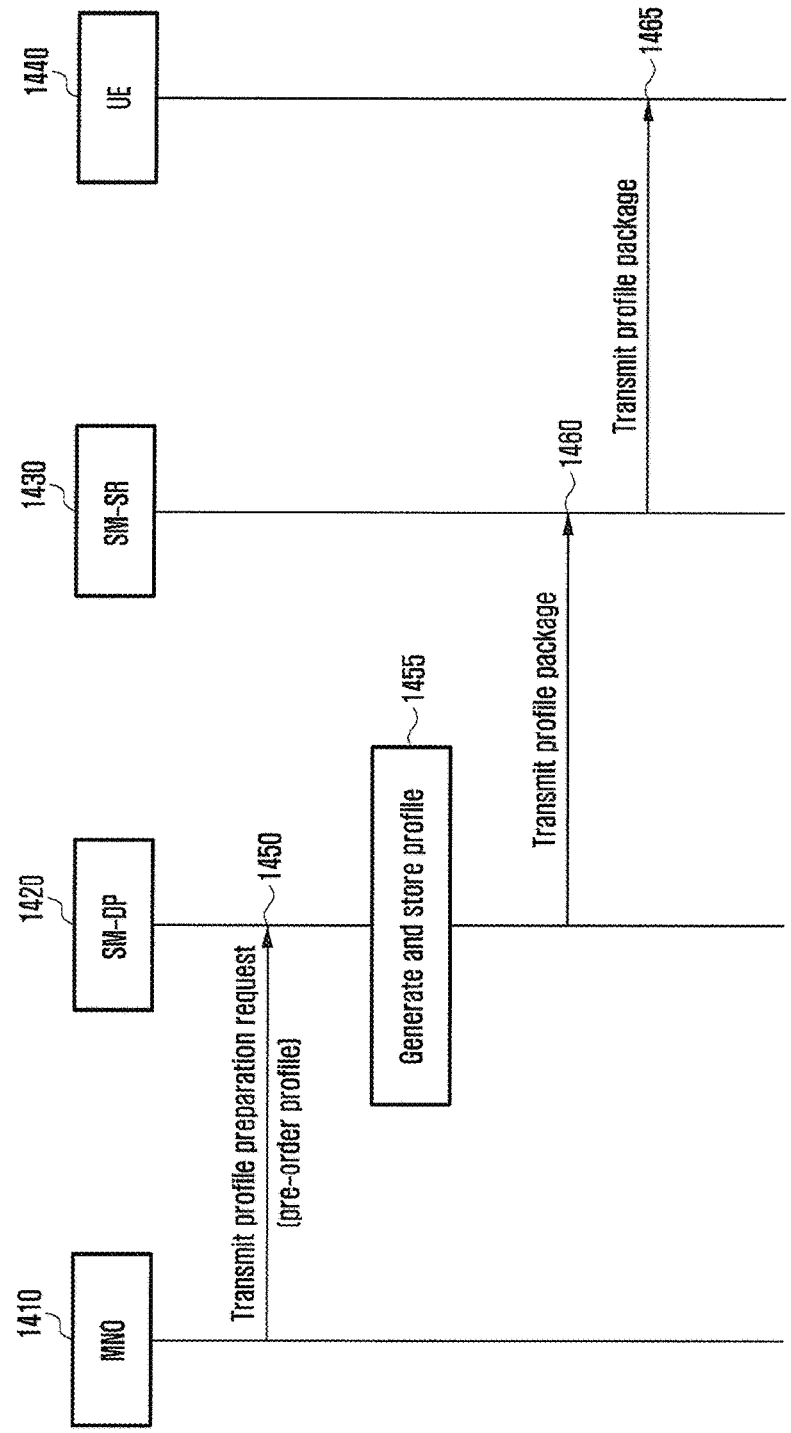
FIG. 14 is a signal flow diagram illustrating a process of transmitting and installing an eUICC profile according to an embodiment of the present disclosure.

FIG. 14 illustrates a process of generating and installing a profile of an eUICC according to an embodiment of the present invention.

Referring to FIG. 14, in operation 1450, a Mobile Network Operator (MNO) 1410 can request an SM-DP 1420 to prepare a large amount of profiles before the profiles are installed in a specific UE 1440. In operation 1455, the SM-DP 1420 can generate and store a profile. At this time, the SM-DP 1420 can previously generate the profiles, store a profile ID (e.g., an ICCID), an IMSI, a K, and an OPc value, and provide the same to the MNO 1410. Then, the MNO 1410 can store the corresponding information even in an MNO server. Thereafter, the MNO 1410 can request the SM-DP 1420 to download one profile among the profiles to the specific eUICC. In this case, the MNO 1410 can transmit, to the SM-DP 1420, an EID value by which the specific eUICC can be classified and a profile ID or an ICCID value by which the profile can be classified. Further, the MNO 1410 can update a data value or configuration information of the MNO server to allow access of the UE 1440 which requests a network access using the corresponding profile, using IMSI, a K value, an OPc value stored in the MNO server. The information transmitted by the MNO 1410 to the SM-DP 1420 can be transmitted in a form of the HTTP message or the SOAP message.

Thereafter, the SM-DP 1420 can install the profile in the eUICC through the process of downloading a profile as described in each embodiment of the present disclosure. The profile package can be transmitted to the UE 1440 on the basis of operation 1460 and operation 1465. The eUICC of the UE can install the received profile package. The above method is similar to a procedure of previously preparing the existing UICC card by allowing the MNO 1410 to order the existing UICC card from an SIM manufacturer and providing the UICC card to a customer, thereby providing a service. Meanwhile, unlike a physical SIM, an eSIM Profile can be remotely downloaded, and thus, it can be efficient to not previously mass-product a profile and transmit information in real-time. For example, when the MNO 1410 should interwork with a plurality of SM-DPs 1420, it is better that, when the profile is downloaded to an individual eUICC as illustrated in FIG. 15, the profile is produced by transmitting necessary information, as compared with a case where profiles are previously produced in a plurality of SM-DPs.

Figure 15:
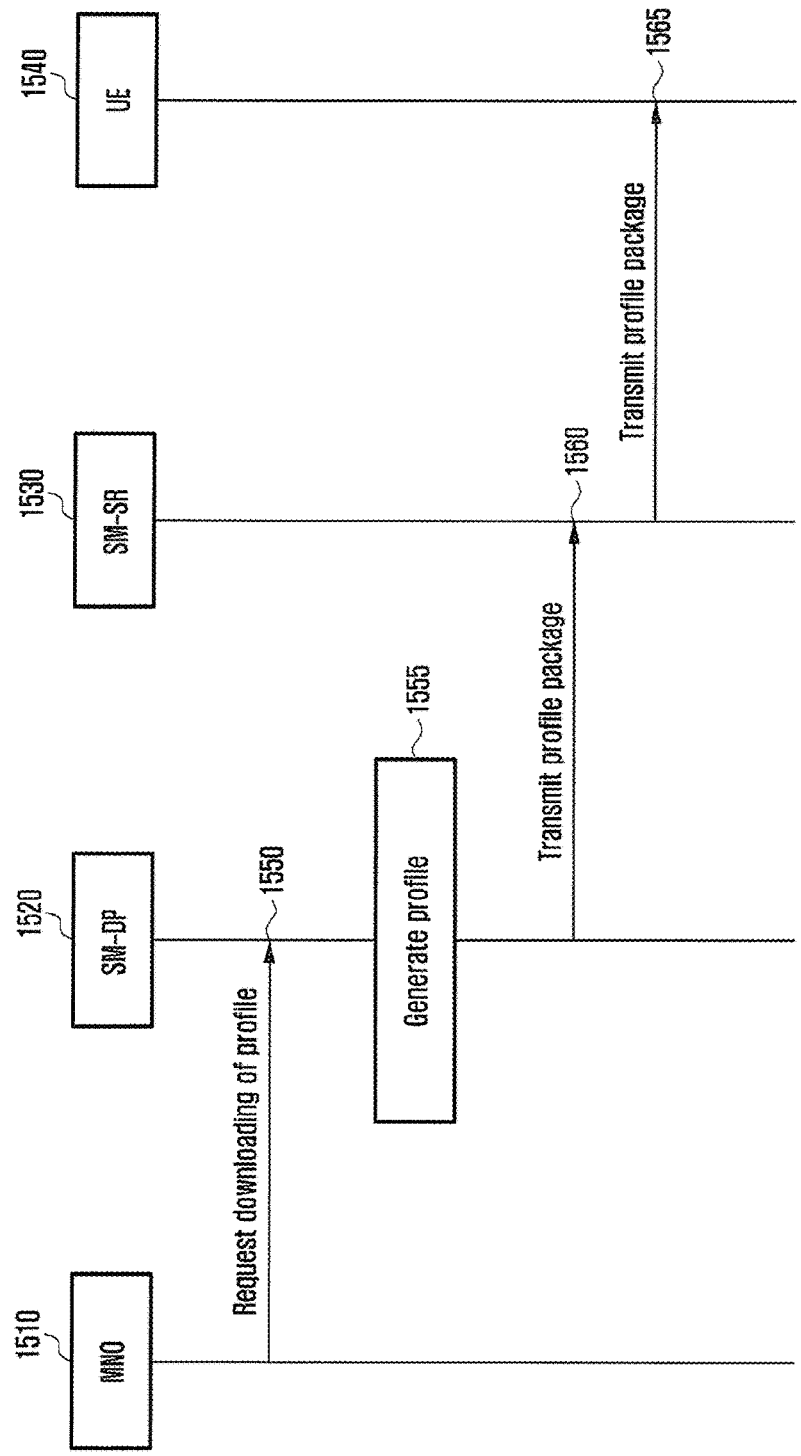
FIG. 15 is a signal flow diagram illustrating a process of transmitting and installing an eUICC profile according to another embodiment of the present disclosure.

Referring to FIG. 15, in operation 1550, the MNO 1510 can transmit a Profile downloading request message to the SM-DP 1520, and the Profile downloading request message can include IMSI, a K value, and an OPc value in addition to an EID and a profile ID (e.g., an ICCID).

In operation 1555, the SM-DP 1520 can generate a profile in real-time or at a configured time using the information to download the profile in real-time or at the configured time. An example relating to the MNO server and the SM-DP 1520 can correspond to a case where the operating method of FIG. 6 and the operating method of FIG. 7 are mixedly used. As an example, the SM-DP 1520 can generate a profile using the corresponding information and download the profile when the Profile downloading request message received from the MNO 1510 includes IMSI, a K value, and an OPc value, identify whether there is a previously-generated profile corresponding to the ICCID or the profile ID when the Profile downloading request message received from the MNO does not include IMSI, a K value, and an OPc value and includes only a EID value and an ICCID value, and download a profile using the corresponding profile when it is identified that there is the profile. Thus, in preparation for the massive release of specific UEs, a profile is produced and downloaded in advance, or else, the profile is downloaded in real-time. As above, two types of profile information transfer schemes can be used independently of each other, and can be selectively operated according to a situation. On the basis of operation 1560 and operation 1565, the profile package can be transmitted to the UE 1540. The eUICC of the UE 1540 can install the received profile package.

Figure 16A:
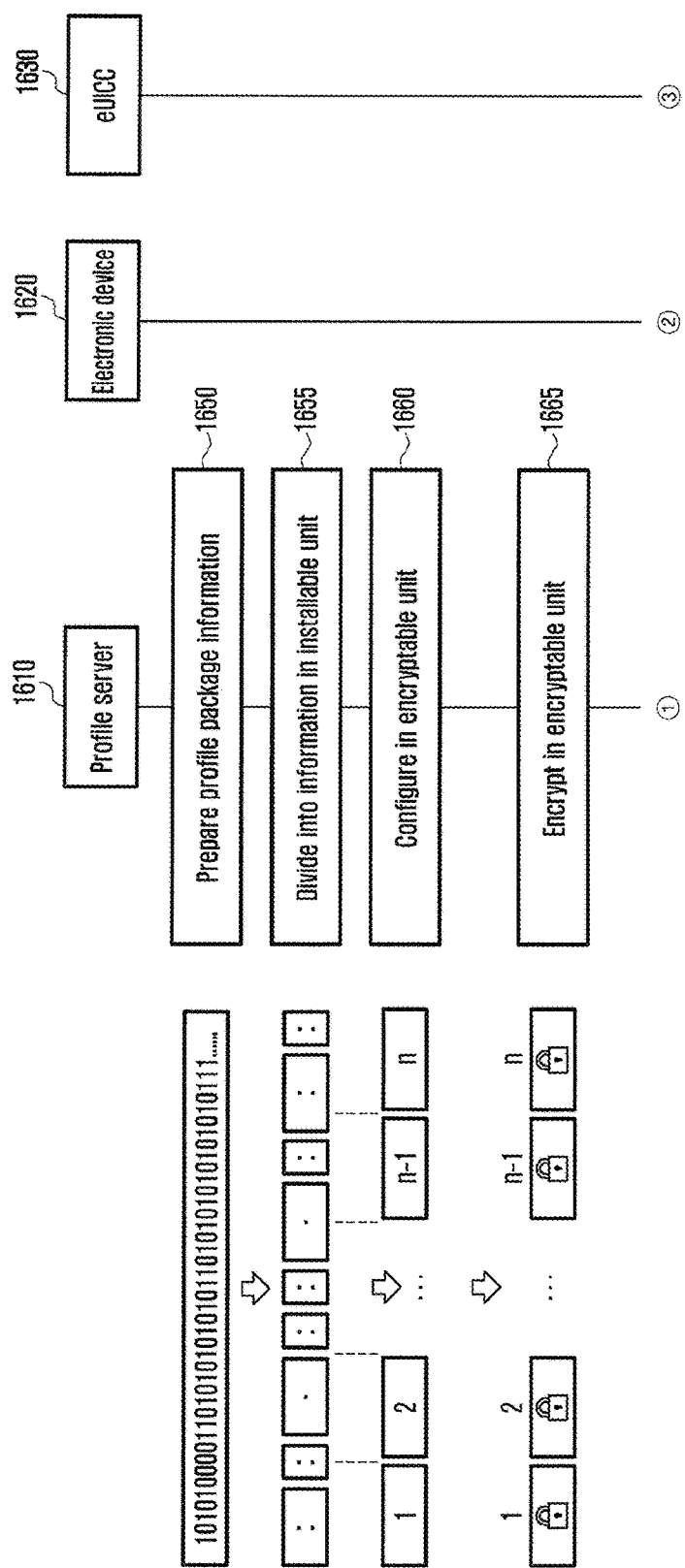
FIGS. 16A and 16B illustrate a process of transmitting and installing an eUICC profile according to another embodiment of the present disclosure.
Figure 16B:
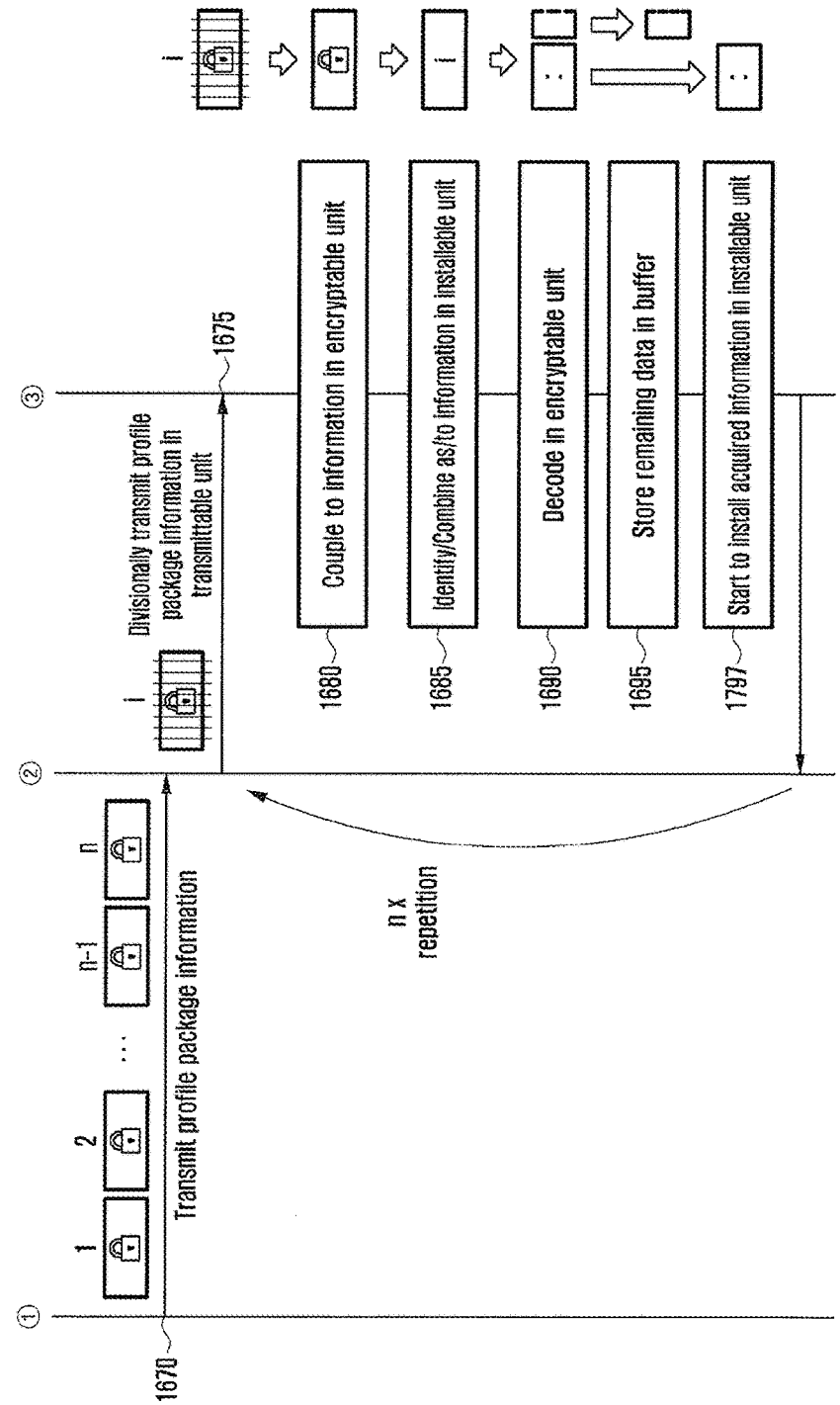

FIGS. 16A and 16B illustrate a process of transmitting and installing an eUICC profile according to another embodiment of the present disclosure.

Referring to FIGS. 16A and 16B, in order to install a profile, a profile server 1610 and a UE 1620 can be provided, and an eUICC 1625, which is included in or can be coupled to the UE, can be provided.

In operation 1650, the profile server 1610 can prepare a profile package. The profile server 1610 can generate a profile package. The profile package can have a TLV form. The profile package having a TLV form can be named a profile package TLV.

In operation 1655, the profile server 1610 can divide the prepared profile package into information in an installable unit. The profile server 1610 can prepare a profile package, divide the profile package information in an installable unit, and can divisionally generate the profile package information in an installable unit when generating the profile package. The information in an installable unit, which is information configured to be installed in the eUICC 1625 even though the entire profile package is not transmitted to the eUICC 1625 when the information in an installable unit is transmitted to the eUICC 1625, can imply a part of information of the entire profile package.

In operation 1660, the profile server 1610 can configure, in an encryptable unit, the information divided in an installable unit. The encryptable unit can be a predetermined size. The profile server can reconfigure a profile package, configured by m pieces of information in an installable unit, as n pieces of information in an encryptable unit. The n and the m can be equal to each other or can be different from each other. With regard to data generated during encrypting for each encryptable unit, an integrity guarantee data for an encryptable unit can be added to data obtained by encrypting an encryptable data. The integrity guarantee data can be a Message Authentication Code.

In operation 1665, the profile server 1610 can encrypt the information reconfigured in an encryptable unit.

In operation 1670, the profile server 1610 can transmit the encrypted information in an encryptable unit to the electronic device 1620. The electronic device can download n pieces of the encrypted information. The profile server 1610 can divide the encrypted information into information in a transmittable unit and transmit the divided information to the electronic device 1620. At this time, the transmittable unit can correspond to a size in which the electronic device having received the profile package can transmit the received profile package to a UICC of the electronic device 1620.

In operation 1675, the electronic device 1620 can transmit the received profile package information to the eUICC 1625 embedded therein or coupled thereto. The electronic device 1620 can divide the received information into information in a transmittable unit and transmit the divided information to the eUICC 1625. When the profile server 1610 divides and transmits the information in a transmittable unit, the received information can be transmitted to the eUICC 1625 as it is.

In operation 1680, the eUICC 1625 can receive the profile package information divided and encrypted in a transmittable unit. The eUICC 1625 can combine the profile package information, divided in a transmittable unit, in an encryptable or decodable unit. The encryptable unit and the decodable unit can be identical to each other. That is, the eUICC 1625 can decode the information divided in a transmittable unit by combining the information with the profile package information in an encryptable unit before the division.

In operation 1685, the eUICC 1625 can decode the profile package information, combined in an encryptable unit. In order to install a profile in the eUICC 1625, the profile server and the electronic device or the eUICC 1625 can perform a mutual authentication process for key agreement. The profile package information can include a parameter necessary for generating an encryption key used to decode the profile package information encrypted by the eUICC. The eUICC can extract a parameter necessary for generating an encryption key from the profile package information, generate the encryption key on the basis of the extracted parameter, and then perform a decoding operation using the generated encryption key.

In operation 1690, the eUICC 1625 can identify the decoded profile package information as information in an installable unit and combine the identified information. The eUICC 1625 can decode the encrypted information and combine the decoded information with the information stored in the buffer, thereby acquiring profile package information in an installable unit.

In operation 1695, the eUICC 1625 stores, in the buffer, remaining information except for the profile package information in an installable unit. The information stored in the buffer can be used for acquiring profile package information in an installable unit by combing the information stored in the buffer and information to be decoded later.

In operation 1697, the eUICC 1625 can start to install the profile package information in an installable unit. In the above method, the eUICC 1625 can firstly start to install profile package information earlier acquired in an installable unit.

When a profile package is not completely installed, the process proceeds to operation 1675 and repeats the above operation. For example, when the electronic device 1620 receives n pieces of encrypted information from the profile server 1610, the process can repeatedly perform operation 1675 to operation 1697 n times. Meanwhile, the eUICC 1625 can shorten a profile installation time by performing operation 1675 to operation 1697 in parallel. In operation 1675 to operation 1697, the eUICC 1625 receives the profile package information divided in a transmittable unit and combines the received information to information in an encryptable unit. The combined information in an encryptable unit can be decoded and the profile can be installed for each installable unit. Even while operation 1675 to operation 1697 are performed, operation 1675 to operation 1697 with regard to newly-received information can be performed in parallel. That is, after operation 1675 to operation 1697 with regard to specific kth information are performed, operation 1675 to operation 1697 with regard to (k+1)th information can be performed. Further, while operation 1675 to operation 1697 with regard to specific kth information are performed, operation 1675 to operation 1697 with regard to (k+1)th information can be performed.

Meanwhile, an operation of the parallel process can be controlled according to an amount of information stored in the buffer. For example, when the amount of information stored in the buffer is equal to or larger than a predetermined value, in the parallel process, a decoding operation is terminated and the profile package information in an installable unit, which is being processed in the buffer, is preferentially performed, so that a buffer value can be reduced. When the buffer value is lowered, the decoding operation is restarted, so that a system can be efficiently operated. Without terminating the parallel process, a control can be performed to make a decoding speed slower, and make an installation speed for the profile package information in an installable unit faster. The above operation can control the parallel process as described above when the profile package information in an installable unit, stored in the buffer, exceeds a predetermined threshold value. That is, the decoding operation is terminated or the decoding speed is made to be slower until the buffer value (the amount of information stored in the buffer) becomes equal to or lower than a predetermined reference value.

Figure 17:
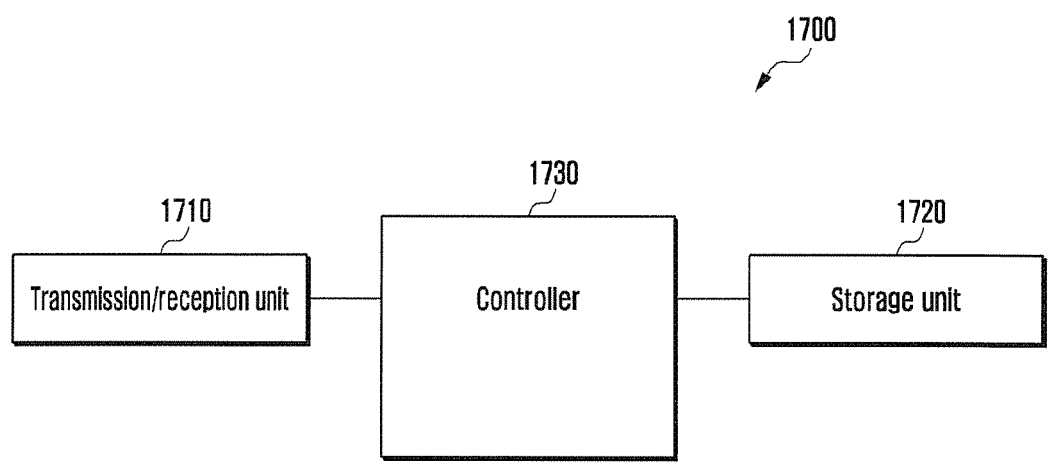
FIG. 17 illustrates a profile server according to an embodiment of the present disclosure.

FIG. 17 illustrates a profile server according to an embodiment of the present disclosure.

Referring to FIG. 17, a profile server 1700 can include a transmission/reception unit 1710 that receives a signal from another node or transmits a signal to another node, a controller 1730 that controls an overall operation of the profile server, and a storage unit 1720 that stores a profile and information on the profile.

According to an embodiment of the present disclosure, the controller 1730 can make a control to generate a profile package, divide the profile package in a unit installable in a UICC of an electronic device, reconfigure the divided profile information in an encryptable unit, and transmit the reconfigured profile information to the electronic device.

Further, the controller 1730 can make a control to encrypt the profile information in an encryptable unit.

The profile package can be configured by n pieces of profile information divided in an installable unit, and the n pieces of profile information can be reconfigured as m pieces of profile information in an encryptable unit. Further, the profile package can have a TLV form.

The controller 1730 can control an operation of the profile server according to an embodiment of the present disclosure as described through FIGS. 1 to 15.

Figure 18:
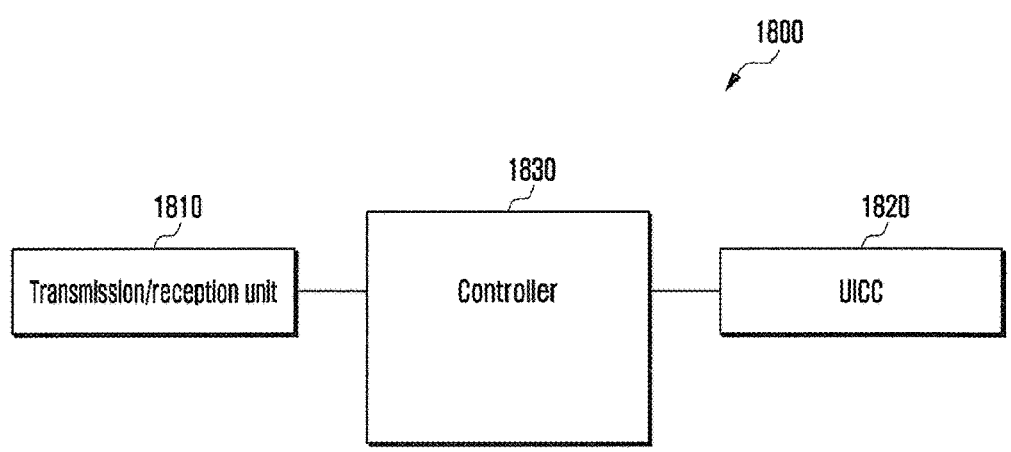
FIG. 18 illustrates a UE according to an embodiment of the present disclosure.

FIG. 18 illustrates an electronic device according to an embodiment of the present disclosure.

Referring to FIG. 18, an electronic device 1800 can include a transmission/reception unit 1810 that receives a signal from another node and transmits a signal to another node, and a controller that controls an overall operation of the electronic device 1800. Further, the electronic device 1800 can include a UICC 1820 that downloads a profile from a profile server and installs the downloaded profile. The controller 1830 can control an operation of the UICC 1820.

The electronic device 1800 can be a UE. The UICC 1820 can include a processor or a controller for installing a profile in the UICC.

The controller 1830 can make a control to receive first profile information in an encryptable unit, which constitutes a profile package, from the profile server, and transmit the first profile information in an encryptable unit to the UICC of the electronic device. The processor can make a control to decode the first profile information in an encryptable unit, transmitted to the UICC, acquire first profile information in an installable unit from the decoded profile information, and install the acquired first profile information in an installable unit.

Further, the processor can make a control to store, in a buffer, remaining profile information excluding the profile information in an installable unit from among the decoded profile information.

Further, the processor can make a control to receive second profile information in an encryptable unit, which constitutes the profile package, from the profile server, transmit the second profile information in an encryptable unit to the UICC of the electronic device, decode the second profile information in an encryptable unit, transmitted to the UICC, acquire second profile information in an installable unit on the basis of the remaining profile information stored in the buffer and the decoded second profile information, install the acquired second profile information in an installable unit, and store, in the buffer, remaining profile information from among the second profile information in an encryptable unit.

Further, the controller 1830 can make a control to divide the first profile information in a transmittable unit and transit the divided first profile information to the UICC. The processor can make a control to combine the information divided in a transmittable unit to the first profile information in an encryptable unit and decode the combined information.

The profile package can be configured by the profile information in a unit installable in the UICC, and the profile information in an encryptable unit can be reconfigured as profile information divided in a unit installable in the UICC. The profile package can be encrypted according to each profile information in a transmittable unit and transmitted from the profile server to the electronic device. The profile package can have a TLV form.

The controller 1830 can control an operation of the electronic device (or eUICC) according to an embodiment of the present disclosure as described through FIGS. 1 to 16. Further, the processor can control an operation of the eUICC according to an embodiment of the present disclosure as described through FIGS. 1 to 16.

The controller 1830 can control an operation of the processor of the eUICC 1820 and can be implemented to perform an operation of the processor.

In the above-described embodiment of the present disclosure, components included in the present disclosure are expressed as a singular form or a plural form according to the presented detailed embodiment. However, for convenience of description, the singular expression or the plural expression has been selected to be suitable only for the presented situation, the present disclosure is not limited to a singular or plural component, components expressed by the plural form can be configured as a singular component, and a component expressed by the singular form can be configured as plural components.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of providing a profile package by a profile server, the method comprising:
   generating an unprotected profile package consisting of a plurality of profile elements, wherein the unprotected profile package consists of a sequence of profile element tag length values (TLVs), and wherein the unprotected profile package is split into the plurality of the data without considering a structure for the plurality of profile elements included in the unprotected profile package;
   generating a protected profile package based on an encryption key and a plurality of data segmented from the unprotected profile package; and
   transmitting profile package information including the protected profile package and a parameter for the encryption key to an electronic device,
   wherein each profile element is to be processed in a universal integrated circuit card (UICC) of an electronic device independently from other profile elements.

2. The method of claim 1, wherein the unprotected profile package consists of n pieces of the plurality of profile elements, and the unprotected profile package is split into m pieces of the plurality of data, wherein m and n are positive integers, respectively.

3. A profile server comprising:
   a transceiver configured to transmit and receive a signal; and
   a controller configured to:
      generate an unprotected profile package consisting of a plurality of profile elements, wherein the unprotected profile package consists of a sequence of profile element tag length values (TLVs), and wherein the unprotected profile package is split into the plurality of the data without considering a structure for the plurality of profile elements included in the unprotected profile package,
      generate a protected profile package based on an encryption key and a plurality of data segmented from the unprotected profile package, and
      transmit profile package information including the protected profile package and a parameter for the encryption key to an electronic device,
   wherein each profile element is to be processed in a universal integrated circuit card (UICC) of an electronic device independently from other profile elements.

4. The profile server of claim 3, wherein the unprotected profile package consists of n pieces of the plurality of profile elements, and the unprotected profile package is split into m pieces of the plurality of data, wherein m and n are positive integers, respectively.

5. A method for downloading a profile package by an electronic device, the method comprising:
   receiving, from a profile server, profile package information including protected profile package and a parameter for an encryption key, wherein the profile package is generated based on the encryption key and a plurality of data segmented from an unprotected profile package;
   generating a plurality of data units from the profile package information;
   transferring the plurality of data units to a universal integrated circuit card (UICC) of the electronic device;

generating a plurality of profile elements from the plurality of data units, wherein each profile element is to be processed independently from other profile elements; and installing the plurality of profile elements in the UICC, wherein the unprotected profile package is split into the plurality of the data without considering a structure for the plurality of profile elements included in the unprotected profile package.

6. The method of claim 5, further comprising:

storing, in a buffer, remaining information included in a data unit except information on a profile element installed in the UICC.

7. The method of claim 5, further comprising:

generating at least one segments from the plurality of data units in the UICC; and decoding the at least one segment based on the parameter for the encryption key;

wherein a profile element among the plurality of profile elements is generated based on the decoded at least one segment.

8. The method of claim 5, wherein the plurality of data units are generated by dividing the profile package information by a transferable format, and wherein the divided plurality of data units are combined to be in an encryptable format.

9. The method of claim 5, wherein a format of the plurality of data units is application protocol data unit (APDU), and wherein each of the plurality of profile elements is in a tag length value (TLV) form.

10. An electronic device for downloading a profile package, the electronic device comprising:

a transceiver configured to transmit and receive a signal;

a controller configured to:

receive, from a profile server, profile package information including protected profile package and a parameter for an encryption key, wherein the profile package is generated based on the encryption key and a plurality of data segmented from an unprotected profile package, generate a plurality of data units from the profile package information, transfer the plurality of data units to a universal integrated circuit card (UICC) of the electronic device; and the UICC configured to:

generate a plurality of profile elements from the plurality of data units, wherein each profile element is to be processed independently from other profile elements, and install the plurality of profile elements in the UICC, wherein the unprotected profile package is split into the plurality of the data without considering a structure for the plurality of profile elements included in the unprotected profile package.

11. The electronic device of claim 10, wherein the UICC is further configured to store, in a buffer, remaining information included in a data unit except information on a profile element installed in the UICC.

12. The electronic device of claim 10, wherein the UICC is further configured to generate at least one segments from the plurality of data units in the UICC, and decode the at least one segment based on the parameter for the encryption key, and wherein a profile element among the plurality of profile elements is generated based on the decoded at least one segment.

13. The electronic device of claim 10, wherein the plurality of data units are generated by dividing the profile package information by a transferable format, and wherein the divided plurality of data units are combined to be in an encryptable format.

14. The electronic device of claim 10, wherein a format of the plurality of data units is application protocol data unit (APDU), and wherein each of the plurality of profile elements is in a tag length value (TLV) form.

* * * * *